(12) United States Patent
Sato et al.

(10) Patent No.: US 12,119,995 B2
(45) Date of Patent: Oct. 15, 2024

(54) NETWORK MANAGEMENT APPARATUS, METHOD, AND PROGRAM

(71) Applicant: NIPPON TELEGRAPH AND TELEPHONE CORPORATION, Tokyo (JP)

(72) Inventors: Masataka Sato, Musashino (JP); Kazuaki Akashi, Musashino (JP); Shingo Horiuchi, Musashino (JP); Kenichi Tayama, Musashino (JP); Kenji Murase, Musashino (JP); Kimihiko Fukami, Musashino (JP); Shohei Nishikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 543 days.

(21) Appl. No.: 17/433,111

(22) PCT Filed: Feb. 25, 2020

(86) PCT No.: PCT/JP2020/007501
§ 371 (c)(1),
(2) Date: Mar. 7, 2022

(87) PCT Pub. No.: WO2020/175478
PCT Pub. Date: Sep. 3, 2020

(65) Prior Publication Data
US 2022/0200864 A1    Jun. 23, 2022

(30) Foreign Application Priority Data

Feb. 25, 2019 (JP) ................................. 2019-031788

(51) Int. Cl.
*H04L 41/08*    (2022.01)
*H04L 45/24*    (2022.01)

(52) U.S. Cl.
CPC .......... *H04L 41/0889* (2013.01); *H04L 45/24* (2013.01)

(58) Field of Classification Search
CPC ..... H04L 41/0889; H04L 45/24; H04L 41/12; H04L 41/145; H04L 41/0843; H04L 41/0894
See application file for complete search history.

(56) References Cited

U.S. PATENT DOCUMENTS 6,154,464 A * 11/2000 Feuerstraeter .... H04L 12/40136
370/469
7,765,283 B2 * 7/2010 Noy ..................... H04L 41/0806
379/15.03

(Continued)

FOREIGN PATENT DOCUMENTS

JP    2017017681 A    1/2017

OTHER PUBLICATIONS

Masataka Sato et al., Study of Variable Management Architecture for Diverse Networks, IEICE Technical Report, vol. 116, No. 324, 2016, pp. 37-42.

*Primary Examiner* — Abdullahi E Salad
(74) *Attorney, Agent, or Firm* — Harness, Dickey & Pierce, P.L.C.

(57) ABSTRACT

A network management device according to an embodiment includes: a path selection processing unit configured to perform path selection processing of selecting a path of a physical layer between a start point and an end point of a network based on a first entity stored in a first storage device configured to store the first entity, the first entity representing an entity of an information object of the network; and an entity generation processing unit configured to perform entity generation processing of generating a second entity of a logical layer corresponding to the path of the physical layer selected by the path selection processing unit based on a (Continued)

specification of the information object stored in a second storage device configured to store the specification.

4 Claims, 43 Drawing Sheets

(56) References Cited

U.S. PATENT DOCUMENTS

| | | | | |
|---|---|---|---|---|
| 2003/0051049 | A1* | 3/2003 | Noy | H04L 41/08 709/223 |
| 2015/0334045 | A1* | 11/2015 | Tremblay | H04L 47/783 709/226 |
| 2016/0226958 | A1* | 8/2016 | Zhang | H04L 45/42 |
| 2017/0005869 | A1* | 1/2017 | Prasad | H04L 45/586 |
| 2017/0070582 | A1* | 3/2017 | Desai | G06F 16/215 |
| 2022/0345372 | A1* | 10/2022 | Fukami | H04L 41/12 |

* cited by examiner

| LAYER TYPE | ENTITY NAME | | MEANING | NOTATION OF DRAWING |
|---|---|---|---|---|
| PHYSICAL | PD (Physical Device) | | DEVICE | ▭ |
| | PP (Physical Port) | | COMMUNICATION PORT THAT DEVICE HAS | □ |
| | PL (Physical Link) | | CONNECTION CABLE BETWEEN DEVICES | ─── |
| LOGICAL | TL (Topological Link) | | CONNECTIVITY BETWEEN DEVICES | ◆─·─◆ |
| | NFD (Network Forwarding Domain) | | TRANSFERABLE RANGE WITHIN DEVICE | ⬭ |
| | TPE (Termination Point Encapsulation) | | TERMINATION POINT OF COMMUNICATION | ○ |
| | FRE (Forwarding Relationship Encapsulation) | NC (Network Connection) | End-to-End CONNECTIVITY FORMED BY LC AND XC BETWEEN TPES | ◆───◆ |
| | | LC (Link Connection) | CONNECTIVITY BETWEEN DEVICES TERMINATING AT TPE | ◆─ ─◆ |
| | | XC (Cross Connect) | CONNECTIVITY WITHIN DEVICE TERMINATING AT TPE | ◆······◆ |

Fig. 2

| Spec TYPE | REGISTERED Spec | MEANING |
|---|---|---|
| PP | PP_PC | PP OF PC |
| | PP_SW | PP OF Switch |
| | PP_R | PP OF Router |
| PL | PL_PC-SW | PL BETWEEN PC AND Switch |
| | PL_SW-SW | PL BETWEEN Switch AND Switch |
| | PL_SW-R | PL BETWEEN Switch AND Router |
| PD | PD_PC | PD OF PC |
| | PD_SW | PD OF Switch |
| | PD_R | PD OF Router |
| TPE | TPE_PC_LD | TPE OF Logical Device Layer OF PC |
| | TPE_PC_E | TPE OF Ethernet LAYER OF PC |
| | TPE_PC_IP | TPE OF IP LAYER OF PC |
| | TPE_SW_LD | TPE OF Logical Device LAYER OF Switch |
| | TPE_SW_E | TPE OF Ethernet LAYER OF Switch |
| | TPE_R_LD | TPE OF Logical Device LAYER OF Router |
| | TPE_R_E | TPE OF Ethernet LAYER OF Router |
| | TPE_R_IP | TPE OF IP LAYER OF Router |

Fig. 12

| Spec TYPE | REGISTERED Spec | MEANING |
|---|---|---|
| TL | TL_PC-SW | TL BETWEEN PC AND Switch |
| | TL_SW-SW | TL BETWEEN Switch AND Switch |
| | TL_SW-R | TL BETWEEN Switch AND Router |
| NFD | NFD_SW | NFD OF Switch |
| | NFD_R | NFD OF Router |
| FRE(LC) | FRELC_PC-SW_E | FRE(LC) OF Ethernet LAYER BETWEEN PC AND Switch |
| | FRELC_SW-SW_E | FRE(LC) OF Ethernet LAYER BETWEEN Switch AND Switch |
| | FRELC_SW-R_E | FRE(LC) OF Ethernet LAYER BETWEEN Switch AND Router |
| | FRELC_PC-R_IP | FRE(LC) OF IP LAYER BETWEEN PC AND Router |
| FRE(XC) | FREXC_SW_E | FRE(XC) OF Ethernet LAYER OF Switch |
| | FREXC_R_IP | FRE(XC) OF IP LAYER OF Router |
| FRE(NC) | FRENC_PC-R_E | FRE(NC) OF Ethernet LAYER BETWEEN PC AND Router |
| | FRENC_PC-PC_IP | FRE(NC) OF IP LAYER BETWEEN PC AND PC |

Fig. 13

| | | | | | | | | | | | | |
|---|---|---|---|---|---|---|---|---|---|---|---|---|
| IP LAYER | | TPE_PC_IP | | | FRENC_PC-R_IP | | | FRENC_PC-PC_IP | | | TPE_R_IP | FREXC_R_IP |
| Ethernet LAYER | | TPE_PC_E | | FRELC_PC-R_E | | FRENC_PC-R_E | | | | | TPE_R_E | |
| | | | FRELC_PC-SW_E | TPE_SW_E | FREXC_SW_E | TPE_SW_E | FRELC_SW-SW_E | TPE_SW_E | FREXC_SW_E | TPE_SW_E | FRELC_SW-R_E | |
| LOGICAL DEVICE LAYER | | TPE_PC_LD | TL_PC-SW | TPE_SW_LD | NFD_SW | TPE_SW_LD | TL_SW-SW | TPE_SW_LD | NFD_SW | TPE_SW_LD | TL_SW-R TPE_R_LD | NFD_R |
| PHYSICAL LAYER | PD_PC | PP_PC | PL_PC-SW | PP_SW | PD_SW | PP_SW | PL_SW-SW | PP_SW | PD_SW | PP_SW | PL_SW-R PP_R | PD_R |

Fig. 14

| USED Spec | TPE_PC_LD | TPE_SW_LD | TPE_SW_LD | ... | TPE_R_LD |
|---|---|---|---|---|---|
| | ↓ | ↓ | ↓ | ↓ | ↓ |
| GENERATED TPE ENTITY OF Logical Device LAYER | PC1_P1_LD_TPE | Switch1_P1_LD_TPE | Switch1_P2_LD_TPE | ... | Router_P1_LD_TPE |
| RELEVANT PHYSICAL ENTITY | PC1_P1 | Switch1_P1 | Switch1_P2 | ... | Router_P1 |

Fig. 20

| USED Spec | TL_PC-SW | TL_SW-SW | ... | TL_SW-R |
|---|---|---|---|---|
| | ↓ | ↓ | ↓ | ↓ |
| GENERATED TL ENTITY OF Logical Device LAYER | PC1-Switch1_TL | Switch1-Switch2_TL | ... | Switch2-Router_TL |
| RELEVANT TPE ENTITY | ·PC1_P1_LD_TPE<br>·Switch1_P1_LD_TPE | ·Switch1_P2_LD_TPE<br>·Switch2_P1_LD_TPE | ... | ·Switch2_P2_LD_TPE<br>·Router_P1_LD_TPE |

Fig. 22

| USED Spec | NFD_SW | NFD_SW | ... | NFD_R |
|---|---|---|---|---|
| ↓ | ↓ | ↓ | ↓ | ↓ |
| GENERATED TL ENTITY OF Logical Device LAYER | Switch1_NFD | Switch2_NFD | ... | Router_NFD |
| RELEVANT TPE ENTITY | ·Switch1_P1_LD_TPE<br>·Switch1_P2_LD_TPE | ·Switch2_P1_LD_TPE<br>·Switch2_P2_LD_TPE | ... | ·Router_P1_LD_TPE<br>·Router_P2_LD_TPE |

Fig. 24

| USED Spec | TPE_PC_E | TPE_SW_E | TPE_SW_E | ... | TPE_R_E |
|---|---|---|---|---|---|
| | ↓ | ↓ | ↓ | ↓ | ↓ |
| GENERATED TPE ENTITY OF Ethernet LAYER | PC1_P1_E_TPE | Switch1_P1_E_TPE | Switch1_P2_E_TPE | ... | Router_P1_E_TPE |
| RELEVANT TPE ENTITY OF Logical Device LAYER | PC1_P1_LD_TPE | Switch1_P1_LD_TPE | Switch1_P2_LD_TPE | ... | Router_P1_LD_TPE |

Fig. 26

| USED Spec | FRELC_PC-SW_E | FRELC_SW-SW_E | ... | FRELC_SW-R_E |
|---|---|---|---|---|
| GENERATED FRE(LC) ENTITY OF Ethernet LAYER | PC1-Switch1_E_FRELC | Switch1-Switch2_E_FRELC | ... | Switch2-Router_E_FRELC |
| RELEVANT TPE ENTITY | ·PC1_P1_E_TPE<br>·Switch1_P1_E_TPE | ·Switch2_P2_E_TPE<br>·Switch2_P1_E_TPE | ... | ·Switch2_P2_E_TPE<br>·Router_P1_E_TPE |

Fig. 28

| USED Spec | FREXC_SW_E | FREXC_SW_E | ... | FREXC_SW_E |
|---|---|---|---|---|
| | ↓ | ↓ | ↓ | ↓ |
| GENERATED FRE(XC) ENTITY OF Ethernet LAYER | Switch1_E_FREXC | Switch2_E_FREXC | ... | Switch6_E_FREXC |
| RELEVANT TPE ENTITY | ·Switch1_P1_E_TPE<br>·Switch1_P2_E_TPE | ·Switch2_P1_E_TPE<br>·Switch2_P2_E_TPE | ... | ·Switch6_P1_E_TPE<br>·Switch6_P2_E_TPE |

Fig. 30

| USED Spec | FRENC_PC-R_E | FRENC_PC-R_E |
|---|---|---|
| | ↓ | ↓ |
| GENERATED FRE(NC) ENTITY OF Ethernet LAYER | PC1-Router_E_FRENC | Router-PC2_E_FRENC |
| RELEVANT TPE ENTITY | ·PC1_P1_E_TPE<br>·Router_P1_E_TPE | ·Router_P2_E_TPE<br>·PC2_P1_E_TPE |

Fig. 32

| USED Spec | TPE_PC_IP | TPE_R_IP | TPE_R_IP | TPE_PC_IP |
|---|---|---|---|---|
| | ↓ | ↓ | ↓ | ↓ |
| GENERATED TPE ENTITY OF IP LAYER | PC1_P1_IP_TPE | Router_P1_IP_TPE | Router_P2_IP_TPE | PC2_P1_IP_TPE |
| RELEVANT TPE ENTITY OF Ethernet LAYER | PC1_P1_E_TPE | Router_P1_LD_TPE | Router_P2_E_TPE | PC2_P1_E_TPE |

Fig. 34

| USED Spec | FRELC_PC-R_IP | FRELC_PC-R_IP |
|---|---|---|
| | ↓ | ↓ |
| GENERATED FRE(LC) ENTITY OF IP LAYER | PC1-Router_IP_FRELC | Router-PC2_IP_FRELC |
| RELEVANT TPE ENTITY | ·PC1_P1_IP_TPE<br>·Router_P1_IP_TPE | ·Router_P2_IP_TPE<br>·PC2_P1_IP_TPE |

Fig. 36

NETWORK MANAGEMENT APPARATUS, METHOD, AND PROGRAM

CROSS-REFERENCE TO RELATED APPLICATIONS

This application is a 371 U.S. National Phase of International Application No. PCT/JP2020/007501 filed on Feb. 25, 2020, which claims priority to Japanese Application No. 2019-031788 filed on Feb. 25, 2019. The entire disclosures of the above applications are incorporated herein by reference.

TECHNICAL FIELD

Embodiments of the present invention relate to a network management device, a method, and a program.

BACKGROUND ART

For network operation services of managing network devices constituting a network (NW) and performing setting operations for the devices in response to orders from users, a network management system is used to automatically perform complicated setting operations for a plurality of devices. The network management system has a network information management function of maintaining management information depending on the network and the devices to be managed.

However, because the existing network management system has the management functions specific to the network and the devices, it is necessary to develop a network management system whenever a network device model and a networking scheme are changed.

Thus, there is a system architecture that eliminates a need to restart the development of a network management system for each managed network in a case that a model of the managed network is changed or a communication scheme is changed (see Non Patent Literature 1, for example).

CITATION LIST

Non Patent Literature

Non Patent Literature 1: Masataka SATO, Kazuaki AKASHI, Shingo HORIUCHI, Tadashi KOTANI, "Study of Variable Management Architecture for Diverse Networks", IEICE Technical Report 116 (324), 37-42, 2016-11-24

SUMMARY OF THE INVENTION

Technical Problem

The architecture described in Non Patent Literature 1 has a mechanism that does not depend on a managed network and that enables general-purpose data to be held and generates a plurality of pieces of network management information (entities) in accordance with a management target. However, in a case that a network using different network schemes (communication protocols) is managed, or in a case that a large number of devices are managed, the amount of generated entities increases, and an operation burden on a network operator (who may hereinafter simply be referred to as an operator) increases.

Also, in a case that a large number of paths that satisfy utilization requirements of users who use the network are present in the managed network, it is necessary for an operator to select which of the paths is to be used, and as a result, the operation burden on the operator further increases.

The present invention mas made in view of the aforementioned circumstances, an object thereof is to provide a network management device, a method, and a program that enable an operation burden required for network setting to be reduced.

Means for Solving the Problem

In order to achieve the aforementioned object, a first aspect of a network management device according to an embodiment of the present invention is a network management device including: a path selection processing unit configured to perform path selection processing of selecting a path of a physical layer between a start point and an end point of a network based on a first entity stored in a first storage device configured to store the first entity, the first entity representing an entity of an information object of the network; and an entity generation processing unit configured to perform entity generation processing of generating a second entity of a logical layer corresponding to the path of the physical layer selected by the path selection processing unit based on a specification of the information object stored in a second storage device configured to store the specification.

A second aspect of the network management device according to the present invention is the network management system according to the first aspect, wherein the second storage device stores, as the specification of the information object, information that defines a relationship between the physical layer and a logical layer that is a lowest layer and a relationship among a plurality of the logical layers including the lowest layer, and the entity generation processing unit acquires, from the second storage device, a first specification of the logical layer that is the lowest layer defined as a higher layer than the physical layer in the path selected by the path selection processing unit, acquires, from the second storage device, a second specification of a logical layer defined as a higher layer than the logical layer that is the lowest layer, and generates the second entity of each logical layer corresponding to the path of the physical layer selected by the path selection processing unit based on the first specification and/or the second specification that is acquired.

A third aspect of the network management device according to the present invention is the network management device according to the first aspect, wherein the entity generation processing unit maintains a relationship with a third entity in an identical layer or a next lower layer when the second entity of the logical layer corresponding to the path of the physical layer selected by the path selection processing unit is generated, and generates the second entity of each logical layer corresponding to the path of the physical layer selected by the path selection processing unit based on the held relationship.

An first aspect of a network management method performed by a network management device according to an embodiment of the present invention is a network management method including: performing path selection processing of selecting a path of a physical layer between a start point and an end point of a network based on a first entity stored in a first storage device configured to store the first entity, the first entity representing an entity of an information object of the network; and performing entity generation processing of generating a second entity of a logical layer corresponding to the path of the physical layer selected in the path selection processing based on a specification of the information object stored in a second storage device configured to store the specification.

A second aspect of the network management method according to the present invention is the network management method according to the first aspect, wherein the second storage device stores, as the specification of the information object, information that defines a relationship between the physical layer and a logical layer that is a lowest layer and a relationship among a plurality of the logical layers including the lowest layer, and the performing of the entity generation processing includes acquiring, from the second storage device, a first specification of the logical layer that is the lowest layer defined as a higher layer than the physical layer in the path selected in the path selection processing, acquiring, from the second storage device, a second specification of a logical layer defined as a higher layer than the logical layer that is the lowest layer, and generating the second entity of each logical layer corresponding to the path of the physical layer selected in the path selection processing based on the first specification and/or the second specification that is acquired.

A third aspect of the network management method according to the present invention is the network management method according to the first aspect, the performing of the entity generation processing includes maintaining a relationship with a third entity in an identical layer or a next lower layer when the second entity of the logical layer corresponding to the path of the physical layer selected by the path selection processing unit is generated, and generating the second entity of each logical layer corresponding to the path of the physical layer selected in the path selection processing based on the maintained relationship.

An aspect of a network management processing program according to an embodiment of the present invention causes a processor to operate as each of the units of the network management device according to any one of the first to third aspects.

Effects of the Invention

According to the first aspect of the network management device in the embodiment of the present invention, the path selection processing of selecting the path of the physical layer between the start point and the end point of the network is performed based on the entity, and the entity of the logical layer corresponding to the path of the selected physical layer is generated based on the specification of the information object. In this manner, a burden related to setting of the entity of the logical layer can be reduced.

According to the second aspect of the network management device in the embodiment of the present invention, each of the relationship between the physical layer and the logical layer that is the lowest layer and the relationship among the plurality of logical layers including the lowest layer is defined, and the logical layer specification of each layer corresponding to the physical layer in the path is acquired. In this manner, the specification of each logical layer of which entity is to be generated can be appropriately acquired.

According to the third aspect of the network management device in the embodiment of the present invention, the relationship with the entity in an identical layer or a next lower layer is held when the entity of the logical layer corresponding to the path of the physical layer is generated, and the entity of each logical layer corresponding to the path of the physical layer is generated. In this manner, the entity of each logical layer corresponding to the physical layer can be appropriately generated.

In other words, according to each aspect of the present invention, it is possible to reduce an operation burden required to set the network.

BRIEF DESCRIPTION OF DRAWINGS

FIG. 2 is a diagram illustrating, in a table form, an example of modeling of a network configuration which is applied to a network management device.

FIG. 12 is a diagram illustrating, in a table form, an example of notations and meanings of registered Specs.

FIG. 13 is a diagram illustrating, in a table form, an example of notations and meanings of registered Specs.

FIG. 14 is a diagram illustrating, in a table form, an example of relations in the registered Specs.

FIG. 20 is a diagram illustrating an example of TPE generation of a logical device layer.

FIG. 22 is a diagram illustrating an example of TL generation of the logical device layer.

FIG. 24 is a diagram illustrating an example of NFD generation of the logical device layer.

FIG. 26 is a diagram illustrating an example of TPE generation of a logical layer.

FIG. 28 is a diagram illustrating an example of FRE(LC) generation of the logical layer.

FIG. 30 is a diagram illustrating an example of FRE(XC) generation of the logical layer.

FIG. 32 is a diagram illustrating an example of FRE(NC) generation of the logical layer.

FIG. 34 is a diagram illustrating an example of TPE generation of the logical layer.

FIG. 36 is a diagram illustrating an example of FRE(LC) generation of the logical layer.

DESCRIPTION OF EMBODIMENTS

Figure 1:
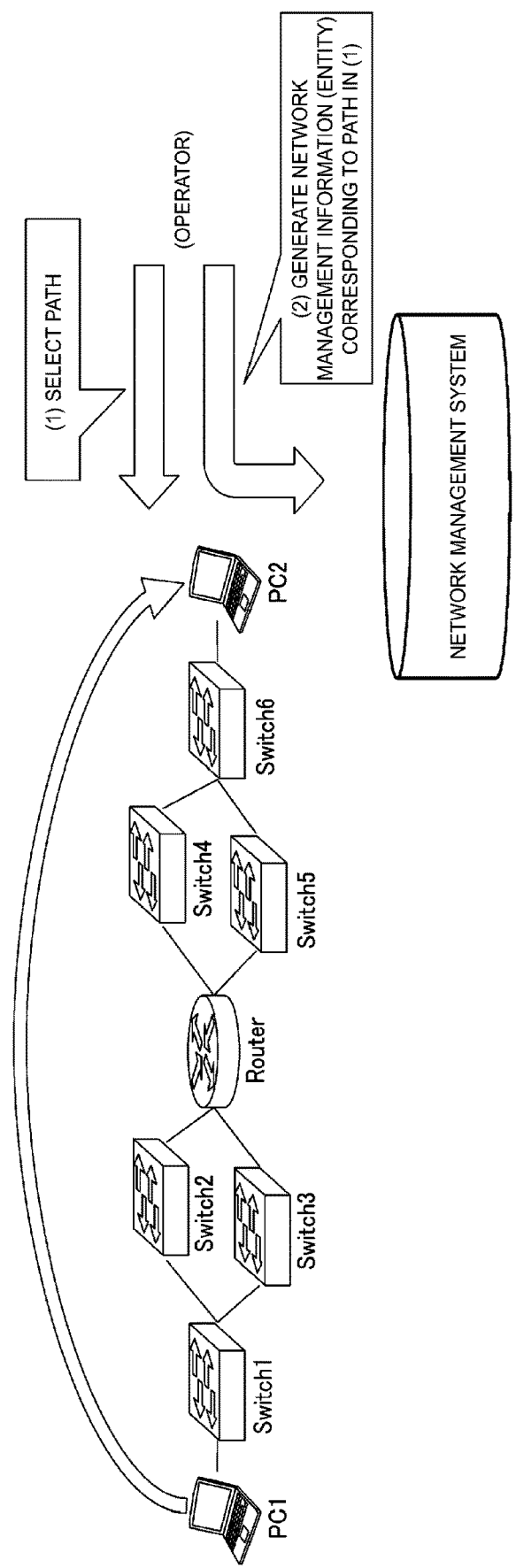
FIG. 1 is a diagram illustrating an example of a network management system.

Hereinafter, an embodiment related to the present invention will be described with reference to drawings.
FIG. 1 is a diagram illustrating an example of a network management system.
Here, a problem in the related art will be described.
As illustrated in FIG. 1, it is assumed that a managed network of a network management system (network management device) includes Switch1, Switch2, Switch3, Switch4, Switch5, and Switch6 that are six Ethernet (registered trademark) switches (which may simply be referred to as switches below) and a router that is one Internet protocol (IP) router (which may simply be referred to as a router below).

In the managed network, one end of Switch2 and one end of Switch3 are communicably connected in parallel to PC1 out of PC1 and PC2 that are two personal computers (PCs), one end of the router is communicably connected to the other end of Switch2 and Switch3, one end of Switch4 and one end of Switch5 are communicably connected in parallel to the other end of the router, one end of Switch6 is communicably connected to the other end of Switch4 and the other end of Switch5, and PC2 is communicably connected to the other end of Switch6.

In response to a request from a user who desires to communicably connect and use PC1 and PC2 on the network, an operator performs an operation of selecting one path from among the following four communication paths that can be formed by the device illustrated in FIG. 1 and generating network management information (entity) corresponding to the selected path for the network management system.

Path (1): PC1→Switch1→Switch2→Router→Switch4→Switch6→PC2

Path (2): PC1→Switch1→Switch3→Router→Switch4→Switch6→PC2

Path (3): PC1→Switch1→Switch2→Router→Switch5→Switch6→PC2

Path (4): PC1→Switch1→Switch3→Router→Switch5→Switch6→PC2

The aforementioned operation of the operator selecting a path and generating an entity causes a burden on the operator, which is problematic.

Entities to be managed by the network management system, include the following types. In a physical layer configuration, entities (information objects) including a physical device (PD), a physical port (PP), and a physical link (PL) are applied. In a logical layer configuration, entities configured by a topological link (TL), a network forwarding domain (NFD), termination point encapsulation (TPE), and forwarding relationship encapsulation (FRE) are applied.

FRE includes network connection (NC), link connect (LC), and cross (X) connect (XC). Through such applications, configurations of the physical layer and the logical layer can be maintained in a unified form.

Here, modeling of a NW configuration (a physical layer and a logical layer) will be described. FIG. 2 is a diagram illustrating, in a table form, an example of modeling of a network configuration applied to the network management device.

As illustrated in FIG. 2, entity names in the physical layer are categorized into PD, PP, and PL. Mapping of "Entity name: meaning" of each entity name is as follows.

Physical device (PD): device

Physical port (PP): communication port that the device has

Physical link (PL): connection cable between devices

As illustrated in FIG. 2, entity names in the logical layer are categorized into TL, NFD, TPE, and FRE (NC, LC, and XC). Mapping of "Entity name: meaning" of each entity name is as follows.

Topological link (TL): connectivity between devices

Network forwarding domain (NFD): transferable range within device

Termination point encapsulation (TPE): termination point of communication

Network connection (NC) of forwarding relationship encapsulation (FRE): End-to-End connectivity established by LC and XC between TPEs Link connect (LC) of FRE: connectivity between devices terminating at TPE Cross connect (XC) of FRE: connectivity within a device terminating at TPE FIG. 3 is a diagram illustrating an example of generation of information of target network for the network management system.

Figure 3:
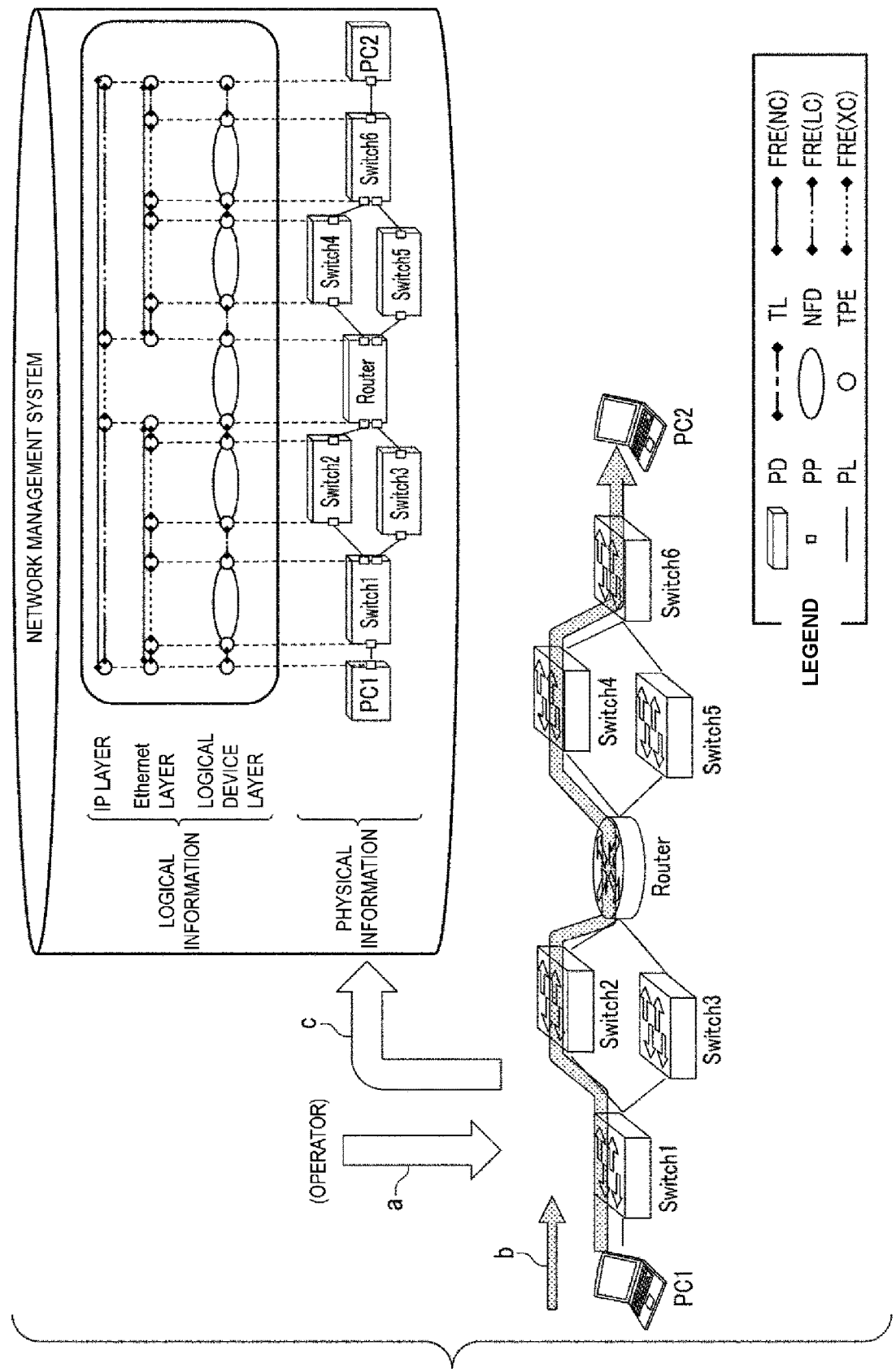
FIG. 3 is a diagram illustrating an example of generation of target network information for the network management system.

As illustrated in FIG. 3, in a case that network management information to which the aforementioned path (1) "PC1→Switch1→Switch2→Router→Switch4→Switch6→PC2" (b in FIG. 3) is allocated is held by the network management system in the managed network through the operator's selection (a in FIG. 3), the total number of entities is 90 as follows, and it is thus necessary for the operator to provide a total of 90 generation instructions (c in FIG. 3) in accordance with the number.

(Physical information: physical layer) PD: 9, PP: 20, PL: 5 (IP layer of logical information, Ethernet layer, and logical device layer (which may be referred to as an LD layer): logical layers) TL: 6, NFD: 6, TPE: 28, FRE(NC): 3, FRE(LC): 8, FRE(XC): 5

A burden of the path selection and the entity creation may thus significantly increase. The logical layers include a plurality of layers that are layered in order of the IP layer, the Ethernet layer, and the logical device layer, with the IP layer corresponding to the uppermost layer of the logical layers and the logical device layer corresponding to the lowermost layer of the logical layers. The lowermost layer of the logical layers is defined as a higher layer than the physical layer.

Figure 4:
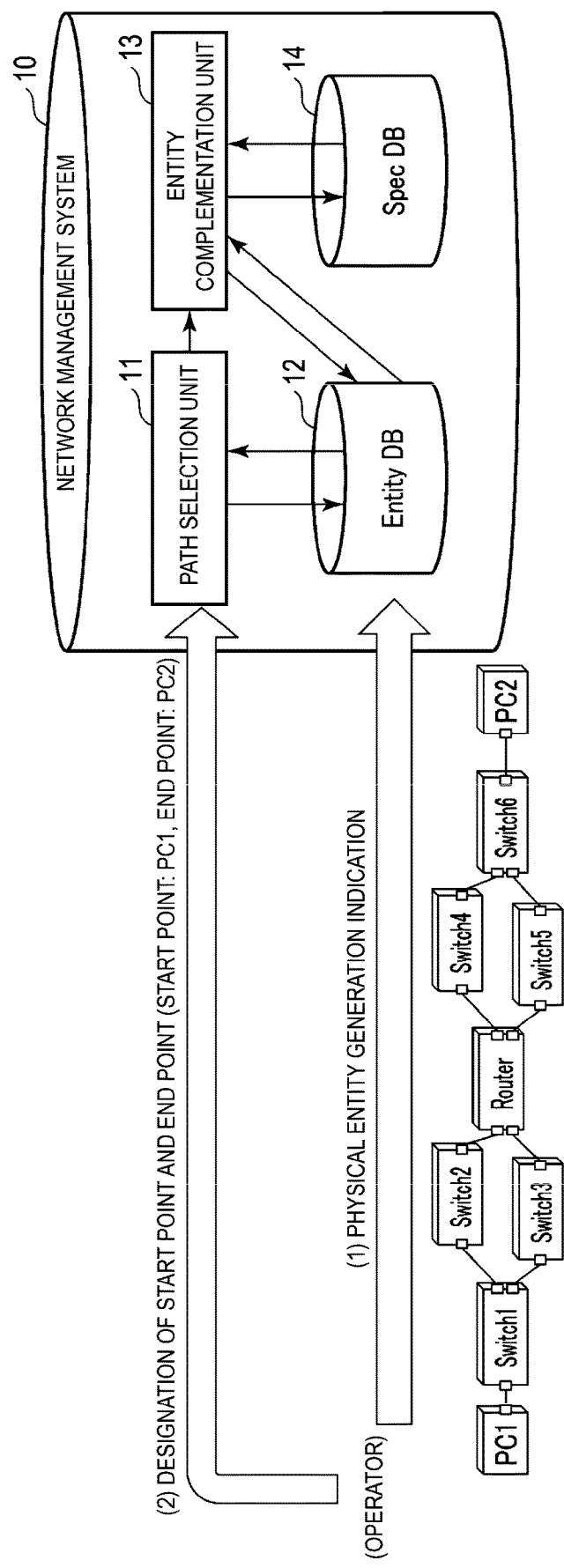
FIG. 4 is a diagram illustrating an application example of the network management system according to an embodiment of the present invention.

FIG. 4 is a diagram illustrating an application example of the network management system according to an embodiment of the present invention.

In the example illustrated in FIG. 4, a network management system 10 has a path selection unit 11, an entity database (DB) 12, an entity complementation unit 13, and a specification (Spec) DB 14 in the embodiment of the present invention. Details of processing related to this will be described below.

The path selection unit 11 selects a path in the managed network. Information related to entities that are information objects is stored in the entity DB 12. The entity complementation unit 13 complements and generates entities to be stored in the entity DB 12. Information of specifications of information objects is stored in the Spec DB 14.

Functions of the path selection unit 11, the entity DB 12, the entity complementation unit 13, and the Spec DB 14 in the network management system 10 are implemented using a computer including a processor such as a central processing unit (CPU) that executes a program, an input device such as a keyboard, an output device such as a display, and storage media such as a random access memory (RAM) and a read only memory (ROM). Operations of each unit will be described below.

Note that, although the network management system 10 can be configured using hardware, the network management system 10 can also be implemented by a combination of a known computer, the entity DB 12, and the Spec DB 14, a computer having the entity DB 12 and the spec DB 14, or the like. In the known computer, a program having a procedure illustrated in a flowchart to be described later is installed via media or a communication line.

The network management system 10 can reduce the operator's operations related to the managed network and enable generation and maintenance of entities after the path selection with less operations.

The operator is assumed to perform each operation for (1) "an instruction for generating physical entities corresponding to a physical network" and (2) "designation of a start point and an end point of the network to be established based on a request from the user". The path selection and complementation of insufficient entities can be automatically executed by the path selection unit 11 and the entity complementation unit 13.

According to the embodiment of the present invention, it is possible to reduce the operator's operations related to entity generation.

Figure 5:
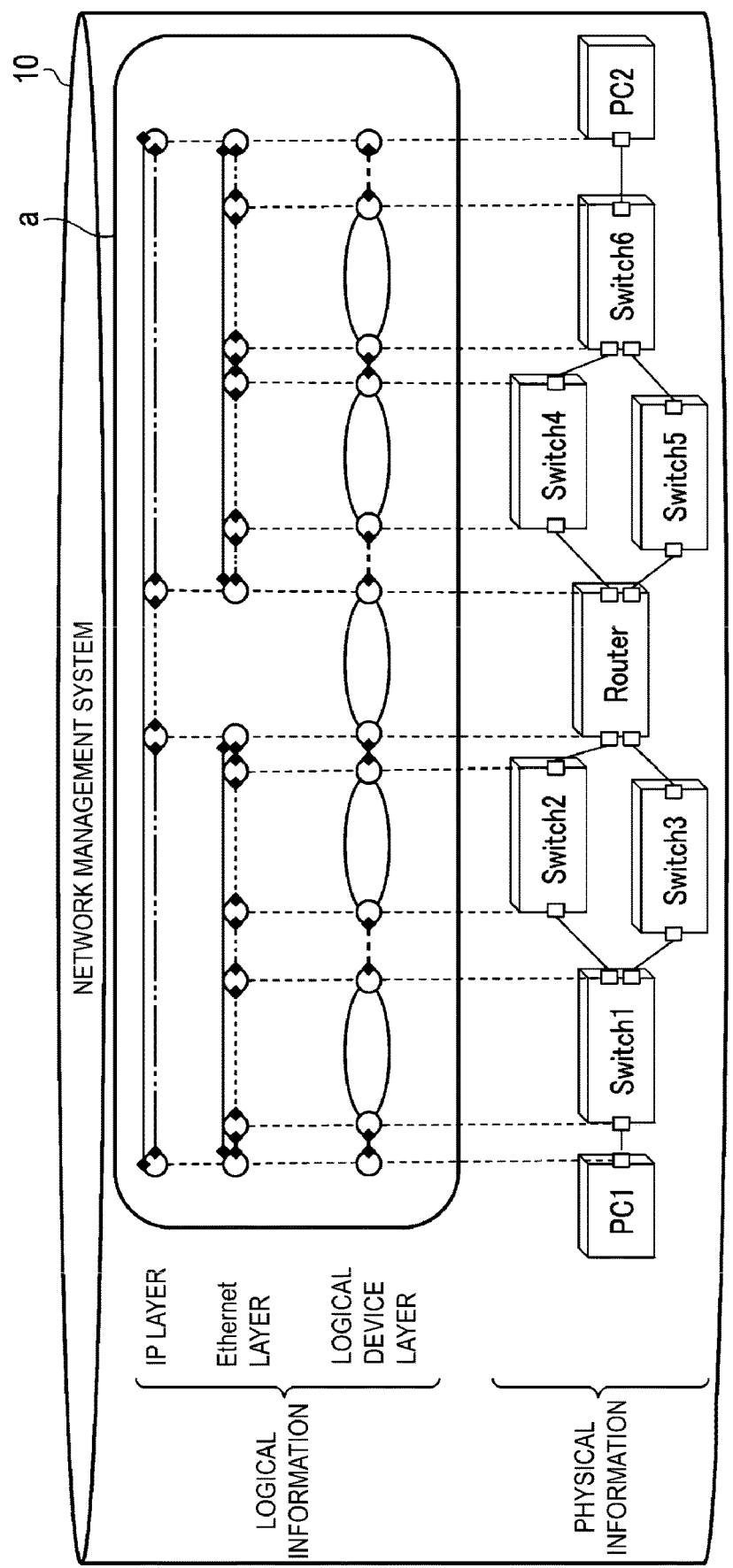
FIG. 5 is a diagram for illustrating an example of entities generated by the network management system according to an embodiment of the present invention.

FIG. 5 is a diagram for illustrating an example of entities generated by the network management system according to the embodiment of the present invention.

In the example illustrated in FIG. 3, for example, an operation related to generation of a total of 90 entities is needed. On the other hand, in the example illustrated in FIG. 5, the aforementioned total of 56 entities of the logical information IP layer, the Ethernet layer, and the logical device layer are generated by the entity complementation unit 13 in the network under the same conditions according to the embodiment of the present invention. Thus, because the operator's operation of generating these entities is not needed, it is only necessary for the operator to perform an operation related to generation of the aforementioned 34 entities.

Next, an example of an entire procedure performed in the embodiment of the present invention will be described.

Prior Preparation

Figure 6:
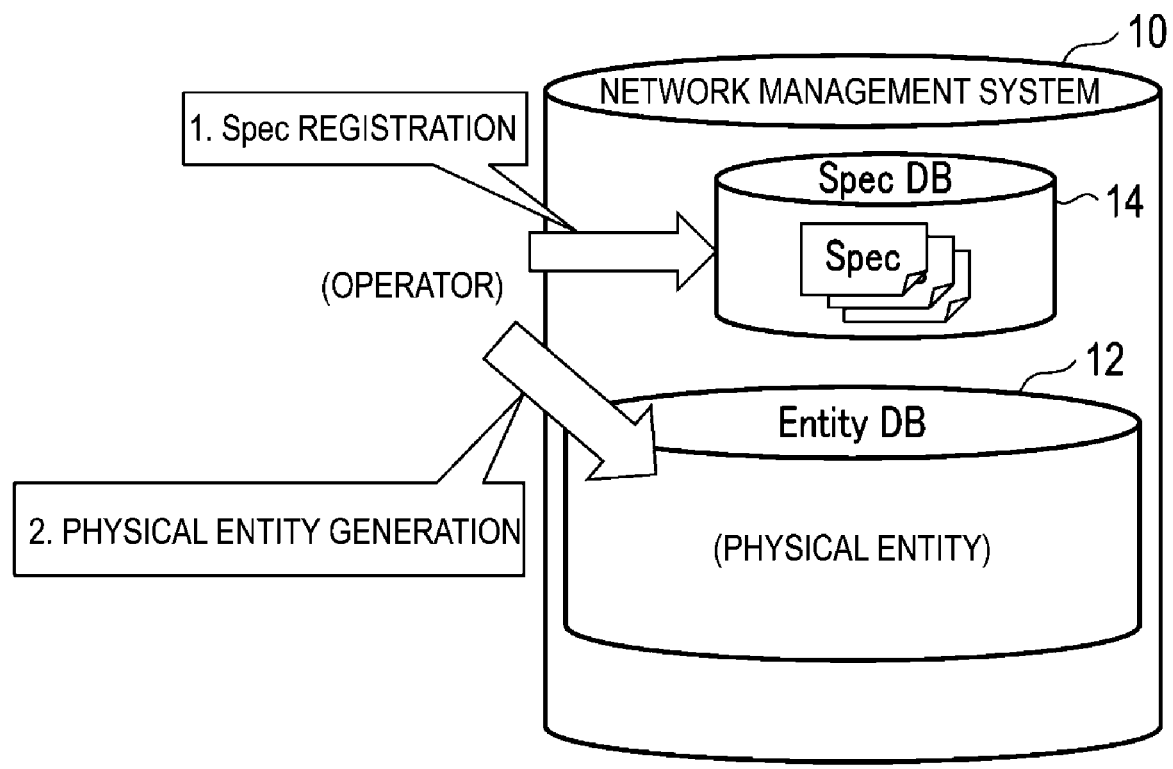
FIG. 6 is a diagram illustrating an example of a procedure performed by the network management system according to an embodiment of the present invention.
Figure 7:
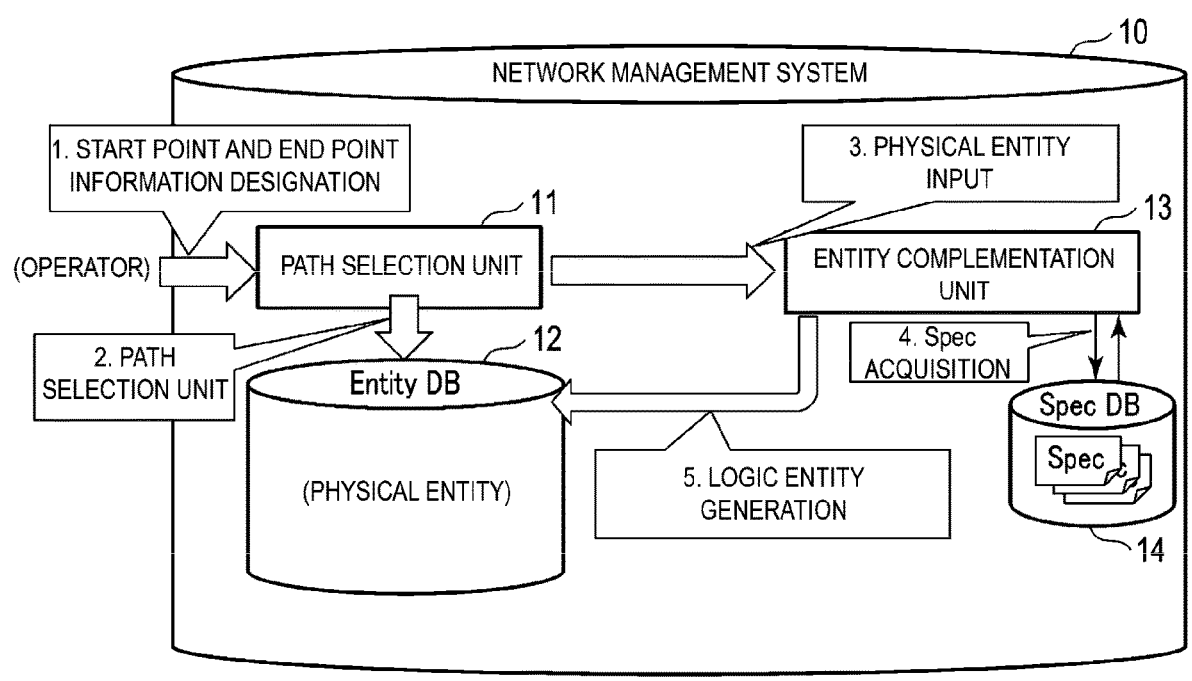
FIG. 7 is a diagram illustrating an example of a procedure performed by the network management system according to an embodiment of the present invention.

FIGS. 6 and 7 are diagrams illustrating an example of a procedure performed by the network management system according to the embodiment of the present invention.

(1) The operator can register a specification defining a network in the Spec DB 14 of the network management system 10 through an input operation.

(2) The operator can generate entities of the physical layer (which may be referred to as physical entities) and store the entities in the entity DB 12 in the network management system 10 through an input operation.

Network path selection and network entity generation (1) The operator inputs start point information and end point information (physical port (PP)) of the network to be established to the path selection unit 11 based on a request from a user. In the example illustrated in FIG. 7, the start point can be PC1 and the end point can be PC2.

(2) The path selection unit 11 traces a connection relationship of the physical link (PL) and the physical device (PD) on physical information from PP of the start point information and selects a path reaching PP of the end point information.

(3) The path selection unit 11 inputs PP/PL/PD corresponding to the selected path to the entity complementation unit 13.

(4) The entity complementation unit 13 acquires Spec from the Spec DB 14.

(5) The entity complementation unit 13 generates entities of the logical layer (which may be referred to as logical entities) corresponding to input PP/PL/PD described above using the acquired Spec.

Next, an example of details of the procedure performed in the embodiment of the present invention will be described.

Path Selection Unit

Figure 8:
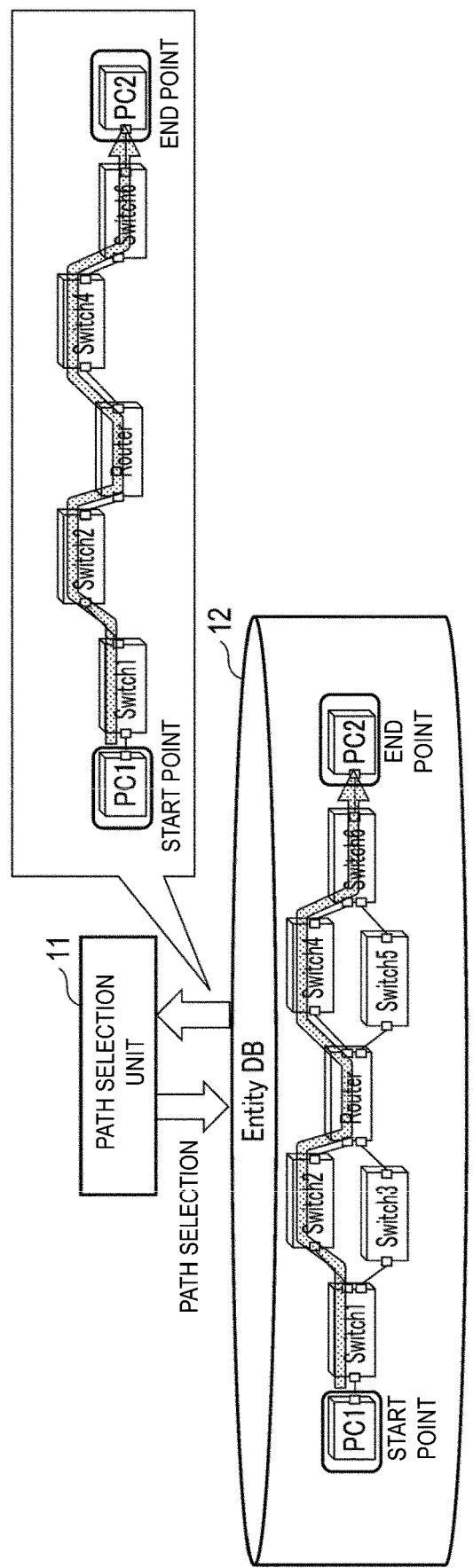
FIG. 8 is a diagram illustrating an example of a procedure performed by a path selection unit of the network management system according to an embodiment of the present invention.

FIG. 8 is a diagram illustrating an example of a processing procedure performed by the path selection unit of the network management system according to the embodiment of the present invention.

The path selection unit 11 traces the connection relationship among the physical entities, selects a path through which it is possible to reach the end point from the start point in a traversal manner, and acquires the physical entities (PP/PL/PD) from the entity DB 12 as a result of the selection.

Also, it is assumed that a path search algorithm that takes into account a minimum hop number, a band, a delay amount, and the like can be applied as a policy for the path selection. A known algorithm can be used as the algorithm itself.

Figure 9:
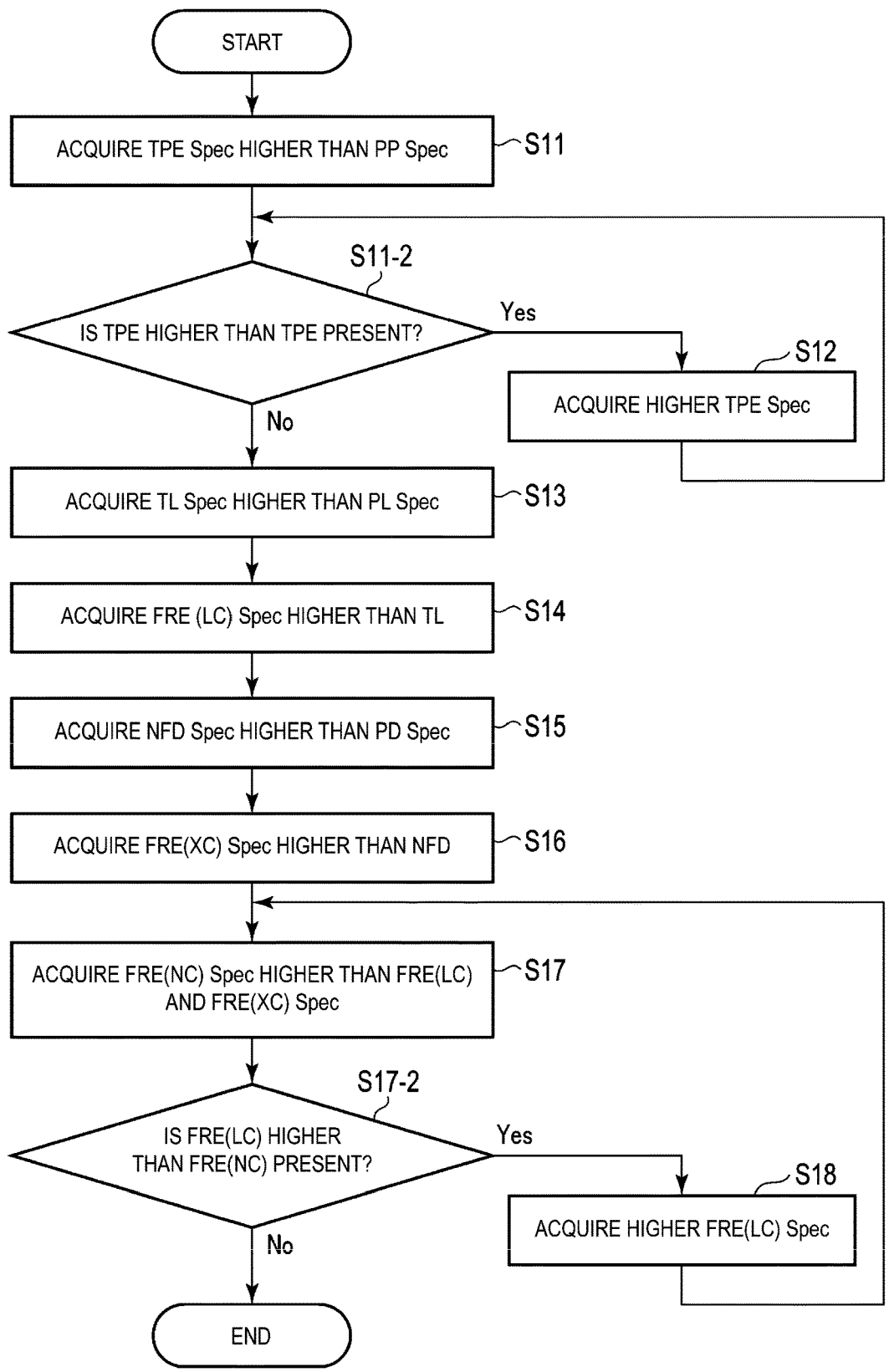
FIG. 9 is a flowchart illustrating an example of a processing procedure related to Spec acquisition performed by an entity complementation unit of the network management system according to an embodiment of the present invention.

Next, details of a processing procedure related to Spec acquisition performed by the entity complementation unit 13 will be described. FIG. 9 is a flowchart illustrating an example of the processing procedure related to the Spec acquisition performed by the entity complementation unit of the network management system according to the embodiment of the present invention.

Overview

The entity complementation unit 13 acquires, from the Spec DB 14, Spec of the logical layer corresponding to PP/PL/PD input from the path selection unit 11. The entity complementation unit 13 holds, in an internal memory, information indicating a relationship between a higher order and a lower order of the acquired Spec along with the acquisition result.

Details (1) The entity complementation unit 13 acquires Spec of TPE defined as a higher layer of Spec of PP from the Spec DB 14 (S11).

(2) In a case that there is TPE Spec defined as a yet higher layer of TPE Spec acquired in (1), the entity complementation unit 13 repeatedly acquires TPE Spec from the Spec DB 14 as well (S12).

(3) The entity complementation unit 13 acquires Spec of TL defined as a higher layer of Spec of PL from the Spec DB 14 (S13).

(4) The entity complementation unit 13 acquires Spec of FRE(LC) defined as a higher layer of TL Spec acquired in (3) from the Spec DB 14 (S14).

(5) The entity complementation unit 13 acquires Spec of NFD defined as a higher layer of Spec of PD from the Spec DB 14 (S15).

(6) The entity complementation unit 13 acquires Spec of FRE(XC) defined as a higher layer of NFD Spec acquired in (5) form the Spec DB 14 (S16).

(7) The entity complementation unit 13 acquires Spec of FRE(NC) defined as a higher layer of Spec of FRE(LC) acquired in (4) and Spec of FRE(XC) acquired in (6) from the Spec DB 14 (S17).

(8) In a case that there is FRE(LC) defined as a yet higher layer of FRE(NC) acquired in (7), the entity complementation unit 13 acquires Spec of this FRE(LC) Spec from the Spec DB 14 and further executes (7) described above (S18). If there is no more FRE(LC) defined as a yet higher layer of FRE(NC) acquired in (7), the entity complementation unit 13 terminates the processing related to Spec acquisition.

Figure 10:
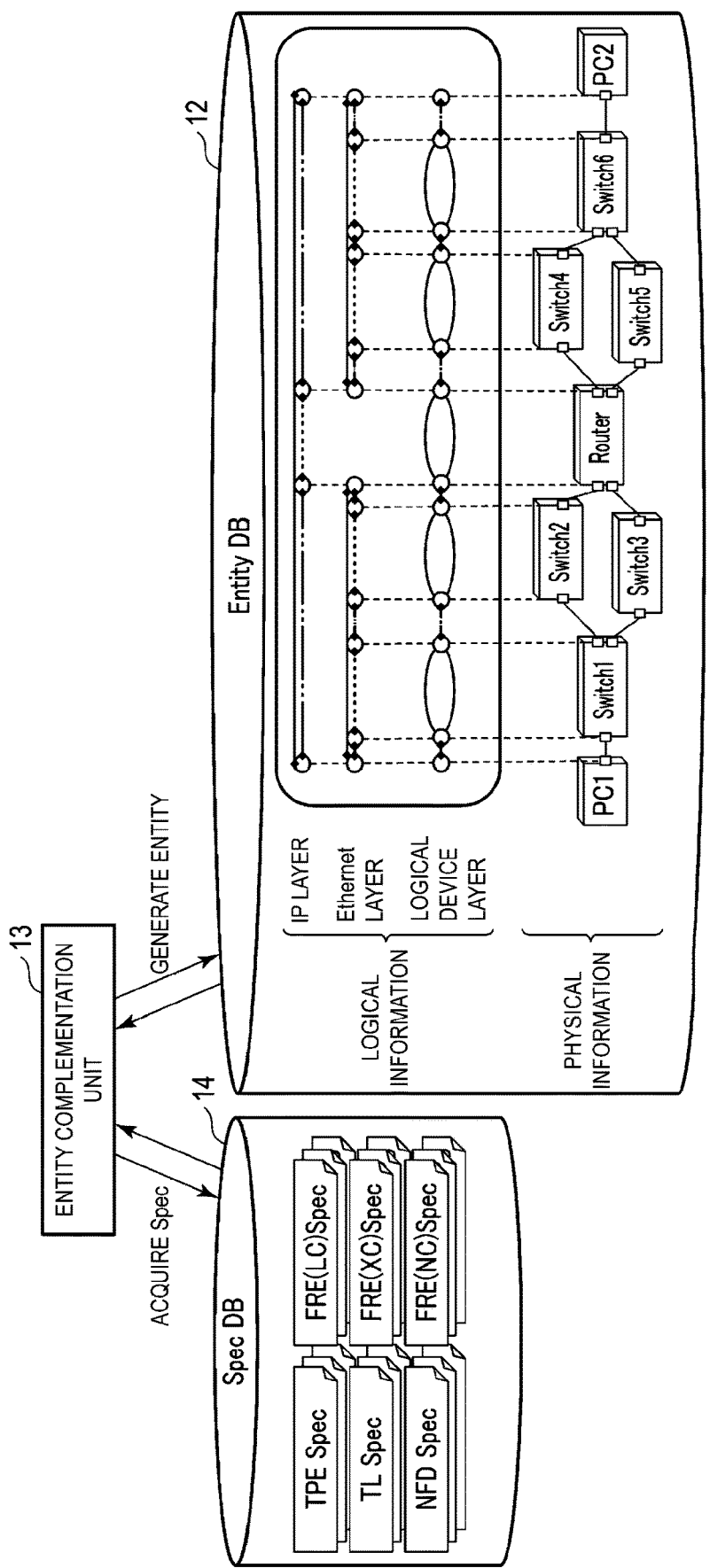
FIG. 10 is a diagram illustrating an overview of the processing related to Spec acquisition performed by the entity complementation unit of the network management system according to an embodiment of the present invention.

Next, details of processing procedure related to logical entity generation performed by the entity complementation unit 13 will be described. FIG. 10 is a diagram illustrating an overview of processing related to the Spec acquisition performed by the entity complementation unit of the network management system according to the embodiment of the present invention.

Overview

The entity complementation unit 13 generates entities (TPE/TL/NFD/FRE(LC)/FRE(XC)/FRE(NC)) corresponding to the acquired Spec.

The entity complementation unit 13 holds, in the internal memory, information indicating a relevance (relationship) with respect to lower entities to which the entities to be generated are related.

Figure 11:
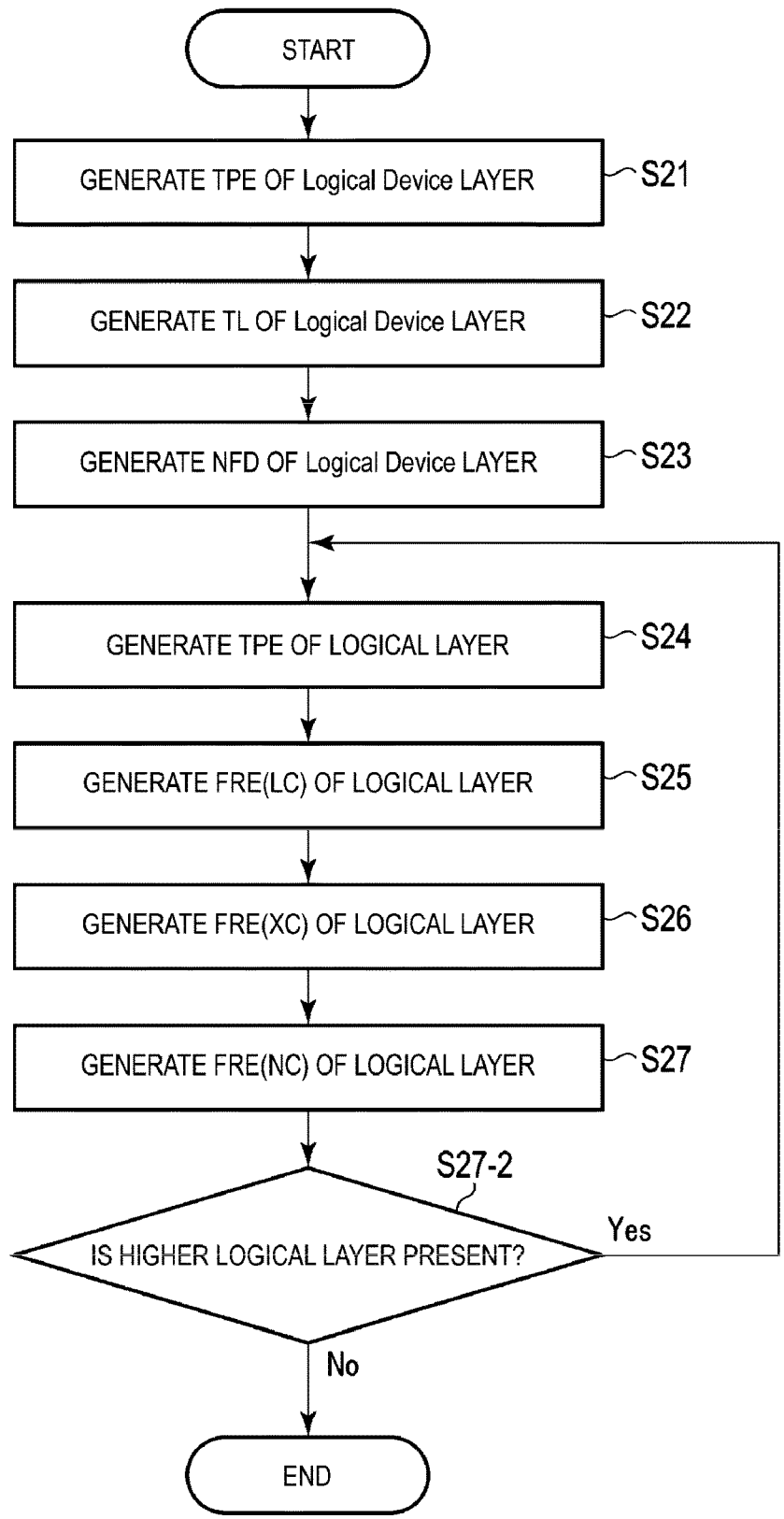
FIG. 11 is a flowchart illustrating an example of a processing procedure related to logical entity generation performed by the entity complementation unit of the network management system according to an embodiment of the present invention.

FIG. 11 is a flowchart illustrating an example of a processing procedure related to logical entity generation performed by the entity complementation unit of the network management system according to the embodiment of the present invention.

Details (1) The entity complementation unit 13 generates a TPE entity of the logical device layer. Hereinafter, the TPE entity may simply be referred to as TPE. When TPE is generated, the entity complementation unit 13 holds information indicating a relevance to the physical entity PP in the internal memory (S21).

(2) The entity complementation unit 13 generates a TL entity of the logical device layer. Hereinafter, the TL entity may simply be referred to as TL. When TL is generated, the entity complementation unit 13 holds information indicating a relevance to TPE of the logical device layer in the internal memory (S22).

(3) The entity complementation unit 13 generates an NFD entity of the logical device layer. Hereinafter, the NFD entity may simply be referred to as NFD. When NFD is generated, the entity complementation unit 13 holds information indicating a relevance to TPE of the logical device layer in the internal memory (S23).

The entity complementation unit 13 performs (4), (5), (6), and (7) described below in order from the lower layer. When (4), (5), (6), and (7) are performed on all the layers, the entity complementation unit 13 terminates (4), (5), (6), and (7).

(4) The entity complementation unit 13 generates TPE of the logical layer. When TPE is generated, the entity complementation unit 13 holds information indicating a relevance to TPE of the lower logical layer in the internal memory (S24).

(5) The entity complementation unit 13 generates an FRE (LC) entity of the logical layer. Hereinafter, the FRE(LC) entity may simply be referred to as FRE(LC). When FRE (LC) is generated, the entity complementation unit 13 holds information indicating a relevance to TPE of the corresponding layer in the internal memory (S25).

(6) The entity complementation unit 13 generates an FRE (XC) entity of the logical layer. Hereinafter, the FRE(XC) entity may simply be referred to as FRE(XC). When FRE (XC) is generated, the entity complementation unit 13 holds information indicating a relevance to TPE of the corresponding layer in the internal memory (S26).

(7) The entity complementation unit 13 generates an FRE (NC) entity of the logical layer. Hereinafter, the FRE(NC) entity may simply be referred to as FRE(NC). When FRE (NC) is generated, the entity complementation unit 13 holds information indicating a relevance to TPE of the corresponding layer in the internal memory (S27).

Hereinafter, an example in which the embodiment of the present invention is applied to a service using the same network as the network illustrated in FIG. 3 as a managed network will be described.

In prior preparation, the following Spec is registered by the operator in the Spec DB 14. FIGS. 12 and 13 are diagrams illustrating, in a table format, an example of notations and meanings of registered Specs.

For PP, PL, PD, TPE, TL, NFD, FRE(LC), FRE(XC), and FRE(NC) that are types of registered Specs, correspondence of "notation of registered Spec: meaning" is as follows.

(PP)

PP_PC: PP of PC

PP_SW: PP of switch

Figure 15:
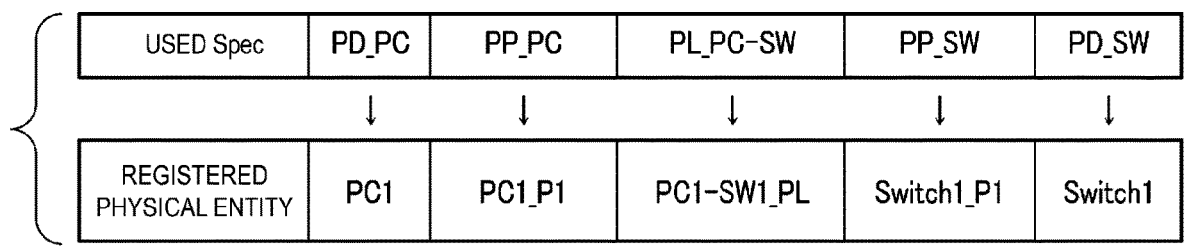
FIG. 15 is a diagram illustrating an example of registration of a physical entity.
Figure 16:
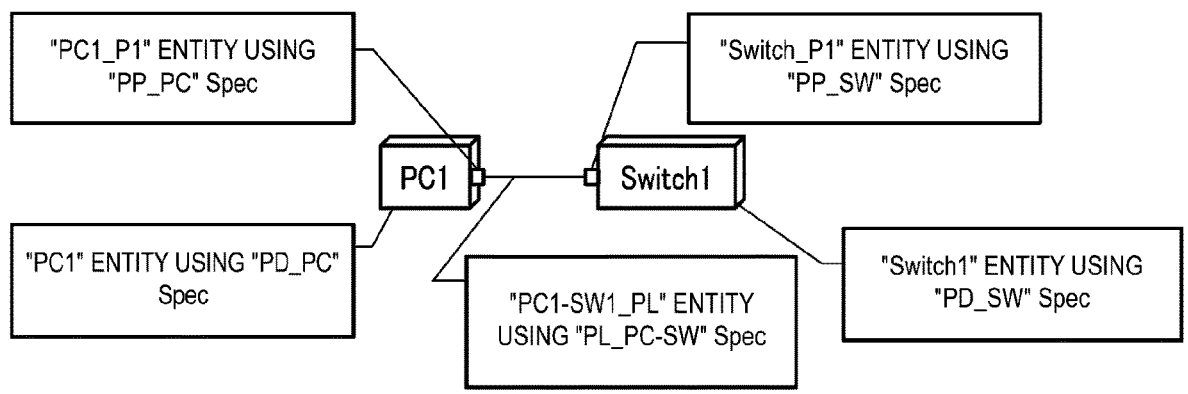
FIG. 16 is a diagram illustrating an example of registration of a physical entity.
Figure 17:
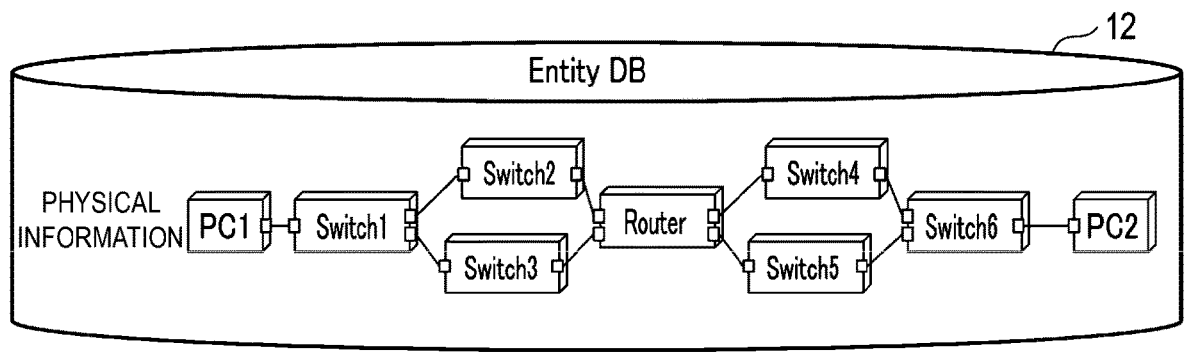
FIG. 17 is a diagram illustrating an example of registration of a physical entity.
Figure 18:
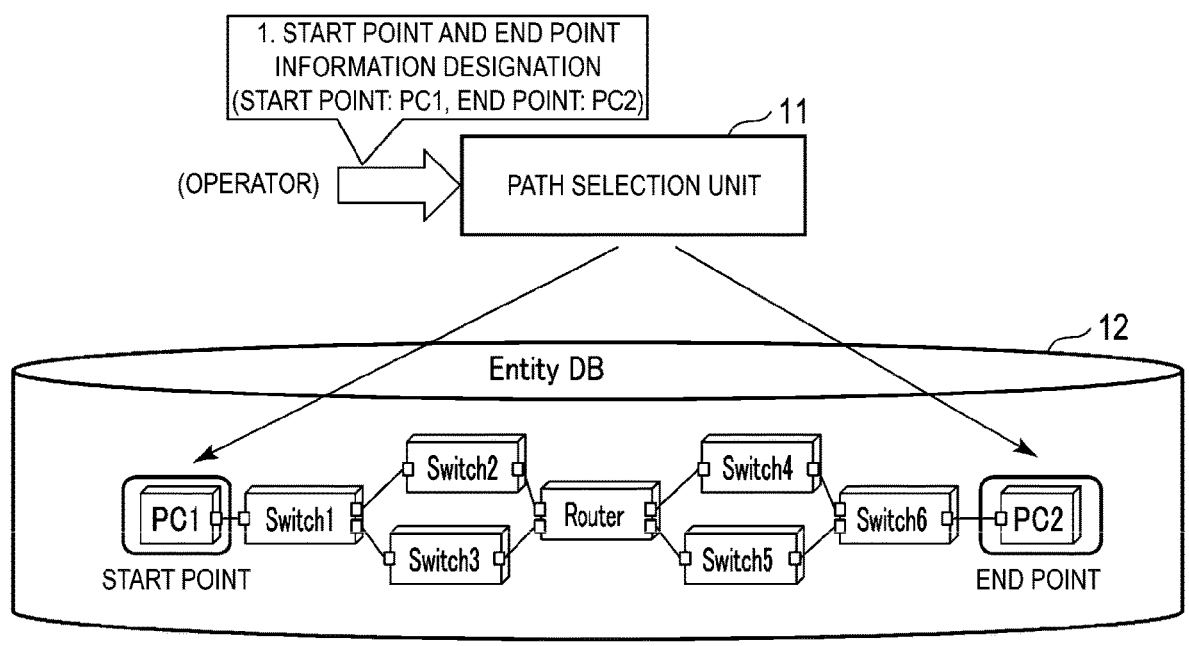
FIG. 18 is a diagram for illustrating an example of designation of start point information and end point information.

PP_R: PP of router (PL)
PL_PC-SW: PL between PC and switch
PL_SW-SW: PL between switch and switch
PL_SW-R: PL between switch and router
(PD)
PD_PC: PD of PC
PD_SW: PD of switch
PD_R: PD of router
    (TPE)
TPE_PC_LD: TPE of logical device layer of PC
TPE_PC_E: TPE of Ethernet layer of PC
TPE_PC_IP: TPE of IP layer of PC
TPE_SW_LD: TPE of logical device layer of switch
TPE_SW_E: TPE of Ethernet layer of switch
TPE_R_LD: TPE of logical device layer of router
TPE_R_E: TPE of Ethernet layer of router
TPE_R_IP: TPE of IP layer of router
(TL)
TL_PC-SW: TL between PC and switch
TL_SW-SW: TL between switch and switch
TL_SW-R: TL between switch and router
(NFD)
NFD_SW: NFD of switch
NFD_R: NFD of router
    FRE(LC)
FRELC_PC-SW_E: FRE(LC) of Ethernet Layer between PC and switch
FRELC_SW-SW_E: FRE(LC) of Ethernet layer between switch and switch
FRELC_SW-R_E: FRE(LC) of Ethernet layer between switch and router
FRELC_PC-R_IP: FRE(LC) of IP layer between PC and router
FRE (XC)
FREXC_SW_E: FRE(XC) of Ethernet layer of switch
FREXC_R_IP: FRE(XC) of IP layer of router
FRE (NC)
FRENC_PC-R_E: FRE(NC) of Ethernet layer between PC and router
FRENC_PC-PC_IP: FRE(NC) of IP layer between PC and PC FIG. 14 is a diagram illustrating, in table form, an example of the relation in the registered Specs.
It is assumed that the registered Specs have relationships of higher and lower layers illustrated in FIG. 14.
The relationships of the Specs in the IP layer, the Ethernet layer, the logical device layer, and the physical layer are as described in (1) to (13) below. Among (1) to (13) below, (1) corresponds to the start point of the path while (13) corresponds to the end point of the path, respectively.
    (1)
(IP layer), (Ethernet layer), and (logical device layer): none
(Physical layer): PD_PC
    (2)
(IP layer): TPE_PC_IP
(Ethernet layer): TPE_PC_E
(Logical device layer): TPE_PC_LD
(Physical layer): PP_PC
    (3)
(IP layer (higher)): FRENC_PC-PC_IP
(IP layer (lower)): FRELC_PC-R_IP
(Ethernet layer (higher)): FRENC_PC-R_E
(Ethernet layer (lower)): FRELC_PC-SW_E
(Logical device layer): TL_PC-SW
(Physical Layer): PL_PC-SW
    (4)
(IP layer (higher, lower)) (Ethernet layer (higher)): same as (3) above
(Ethernet layer (lower)): TPE_SW_E
(Logical device layer): TPE_SW_LD
(Physical layer): PP_SW
    (5)
(IP layer (higher, lower)) (Ethernet layer (higher)): same as (3) above
(Ethernet layer (lower)): FREXC_SW_E
(Logical device layer): NFD_SW
(Physical layer) PD_SW
    (6)
Same as (4) above
    (7)
(IP layer (upper, lower)) (Ethernet layer (upper)): same as (3) above
(Ethernet layer (lower)): FRELC_SW-SW_E
(Logical device layer): TL_SW-SW
(Physical layer): PL_SW-SW
    (8)
Same as (4) above
    (9)
Same as (5) above
    (10)
Same as (4) above
    (11)
(IP layer (upper, lower)) (Ethernet layer (upper)): same as (3) above
(Ethernet layer (lower)): FRELC_SW-R_E
(Logical device layer): TL_SW-R
(Physical layer): PL_SW-R
    (12)
(IP layer (higher)): FRENC_PC-PC_IP (same as (3) above)
(IP layer (lower)): TPE_R_IP
(Ethernet layer): TPE_R_E
(Logical device layer): TPE_R_LD
(Physical layer) PP_R
    (13)
(IP layer (higher)): FRENC_PC-PC_IP (same as (3) above)
(IP layer (lower)): FREXC_R_IP
(Ethernet layer): none
(Logical device layer): NFD_R
(Physical layer): PD_R FIGS. 15, 16 and 17 are diagrams illustrating an example of registration of physical entities.
The physical entities are registered in the Entity DB 12 by the operator using the aforementioned registered Specs of the physical layers.
FIG. 15 illustrates correspondences of physical entity information registered using the Specs of the physical layers.
The physical entities illustrated in FIG. 15 are assumed to be notated in the form illustrated in FIG. 16. Also, it is assumed that mutual connection relationships are present between the entities. As illustrated in FIG. 17, the physical entities are assumed to be registered in the entity DB 12 in prior preparation. It is assumed that the correspondences with the Specs are similar to those in FIG. 15.
The relationships between the used Specs and the registered physical entities illustrated in FIG. 15 and the corresponding notations in FIG. 16 will be described in (a) to (e) below.
    (a)
(Used Spec) PD_PC
(Registered physical entity) PC1
(Notation of physical entity) "PC1" entity using "PD_PC" Spec (b)
(Used Spec) PP_PC
(Registered physical entity) PC1_P1
(Notation of physical entity) "PC1_P1" entity using "PP_PC" Spec
(c)
(Used Spec) PL_PC-SW
(Registered physical entity) PC1-SW1_PL
(Notation of physical entity) "PC1-SW1_PL" entity using a "PL_PC-SW" Spec
(d)
(Used Spec) PP_SW
(Registered physical entity) Switch1_P1
(Notation of physical entity) "Switch1_P1" entity using "PP_SW" Spec
(e)
(Used Spec) PD_SW
(Registered physical entity) Switch1
(Notation of physical entity) "Switch1" entity using "PD_SW" Spec Next, designation of start point information and end point information will be described. FIG. 18 is a diagram for illustrating an example of designation of start point information and end point information.

The operator designates, as a start point of a path, "PC1" that is a physical entity stored in the entity DB 12 and designates, as an end point of the path, "PC2" that is a physical entity, for the managed network. The path selection unit 11 records the entities as the start point and the end point.

Next, path selection will be described.
The path selection unit 11 traces connection relationships between the physical entities, selects a path that can reach the end point from the start point in a traversable manner, and acquires physical entities (PP/PL/PD) as selection results from the entity DB 12.
Here, the path corresponding to the aforementioned path "PC1→Switch1→Switch2→Router→Switch4→Switch6→PC2" is selected. Here, the description of PP and PL is omitted.

Figure 19:
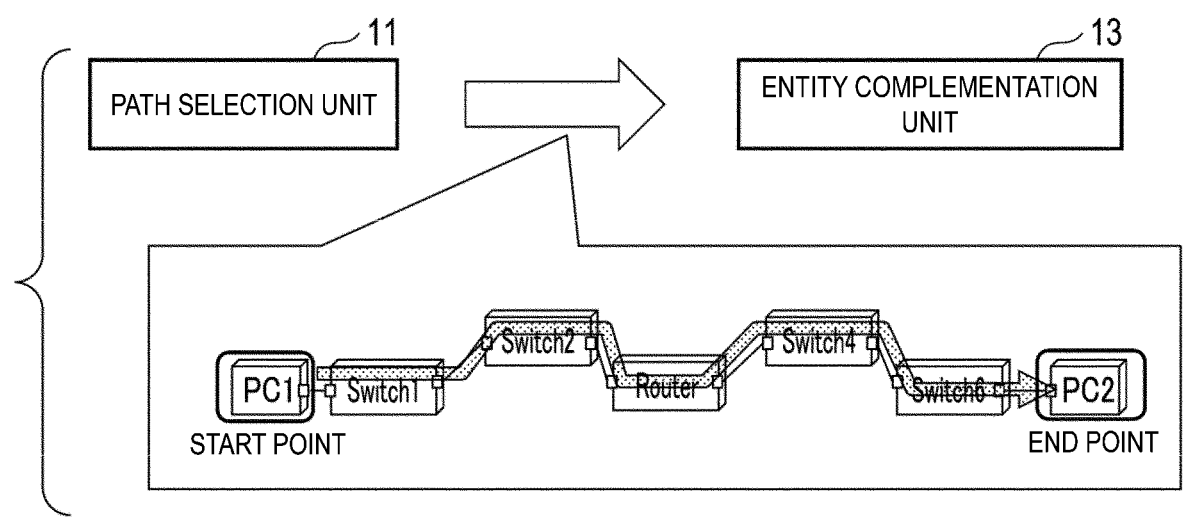
FIG. 19 is a diagram illustrating an example of a path input.

Next, a path input will be described. FIG. 19 is a diagram illustrating an example of a path input.
The path selection unit 11 inputs physical entities (PP/PL/PD) corresponding to the acquired path to the entity complementation unit 13.

Next, Spec acquisition will be described.
The entity complementation unit 13 acquires the Spec of the logical entity from the Spec DB 14 as described in (1) to (8) above based on the input physical entities.
(1) The entity complementation unit 13 acquires, from the Spec DB 14, the Spec of TPE defined as a higher layer of the Spec of PP.
Specifically, because the physical entity "PC1_P1" is based on the Spec "PP_PC", the entity complementation unit 13 acquires "TPE_PC_LD" defined in the higher level of the Spec "PP_PC" from the Spec DB 14.
Similarly, the entity complementation unit 13 acquires each of "TPE_SW_LD" in the higher level of the Spec "PP_SW" of each PP of Switch1/2/4/6 and the Spec "TPE_R_LD" in the higher layer of the Spec "PP_R" of PP of Router from the Spec DB 14.
(2) In a case that there is a TPE Spec defined as a yet higher layer of the TPE Spec acquired in (1), the entity complementation unit 13 repeatedly acquires the TPE Spec as well from the Spec DB 14.
Specifically, the entity complementation unit 13 acquires all the Specs in the higher level of the logical device layer acquired in (1) by repeatedly accessing the Spec DB 14.

Acquisition targets are "TPE_PC_E", "TPE_PC_IP", "TPE_SW_E", "TPE_R_E", and "TPE_R_IP".

(3) The entity complementation unit 13 acquires the Spec of TL defined as a higher layer of the Spec of PL from the Spec DB 14.
Specifically, because the physical entity "PC1-SW1_PL" is based on the Spec "PL_PC-SW", the entity complementation unit 13 acquires "TL_PC-SW" defined in a higher level of the "PL_PC-SW" Spec from the Spec DB 14.
Similarly, the entity complementation unit 13 acquires, from the Spec DB 14, "TL_SW-SW" and "TL_SW-R" defined in the higher level of the Specs of the physical entities between switches and between a switch and the router.
(4) The entity complementation unit 13 acquires, from the Spec DB 14, the Spec of FRE(LC) defined as a higher layer of the TL Spec acquired in (3).
Specifically, the entity complementation unit 13 acquires all the Specs in the higher level of the logical device layer acquired in (3) by repeatedly accessing the Spec DB 14.
Acquisition targets are "FRELC_PC-SW_E", "FRELC_SW-SW_E", and "FRELC_SW-R_E".
(5) The entity complementation unit 13 acquires the Spec of NFD defined as a higher layer of the Spec of PD from the Spec DB 14.
Specifically, because the physical entity "Switch1" is based on the Spec "PD_SW", the entity complementation unit 13 acquires "NFD_SW" defined in the higher level of the Spec "PD_SW" from the Spec DB 14.
Similarly, the entity complementation unit 13 acquires the Spec "NFD_R" in the higher level of the Spec "PD_R" of the router from the Spec DB 14.
(6) The entity complementation unit 13 acquires the Spec of FRE(XC) defined as the higher layer of the NFD Spec acquired in (5) from the Spec DB 14.
Specifically, the entity complementation unit 13 acquires all the Specs in the higher level of the logical device layer acquired in (5) by repeatedly accessing the Spec DB 14.
Acquisition targets are "FREXC_SW_E" and "FREXC_R_IP".
(7) The entity complementation unit 13 acquires the Spec of FRE(NC) defined in the higher level of the Specs of FRE (LC) acquired in (4) and FRE(XC) acquired in (6) from the Spec DB 14.
Specifically, the entity complementation unit 13 acquires, from the Spec DB 14, "FRENC_PC-R E" that is a combination of "FRELC_PC-SW_E", "FRELC_SW-SW_E", and "FREXC_SW_E" that are Specs of the Ethernet layer among the acquired Specs.
(8) In a case that there is FRE(LC) defined as a yet higher layer of FRE(NC) acquired in (7), the entity complementation unit 13 acquires the FRE(LC) Spec from the Spec DB 14 and further executes (4) above. If there is no more FRE(LC) defined in the higher level of FRE(NC), the entity complementation unit 13 terminates the processing related to the Spec acquisition.

Specifically, the entity complementation unit 13 acquires "FRELC_PC-R_IP" defined in the higher level of the Spec "FRENC_PC-R_E" acquired in (7) from the Spec DB 14. Furthermore, the entity complementation unit 13 acquires "FRENC_PC-PC_IP" that is a combination of the acquired "FRELC_PC-R_IP" and "FREXC_R_IP" acquired in (6) from the Spec DB 14.

As described above, the processing related to the Spec acquisition terminates because no more Spec defined in the higher level is present.

Next, entity generation will be described.
The entity complementation unit 13 generates entities of logical layers for the group of the aforementioned acquired Specs in order from the lower layer as described in (1) to (7) below and stores the entities in the entity DB 12.
(1) The entity complementation unit 13 generates TPE of the logical device layer. In the generation, the entity complementation unit 13 holds information indicating a relevance to the physical entity PP in the internal memory.

Figure 21:
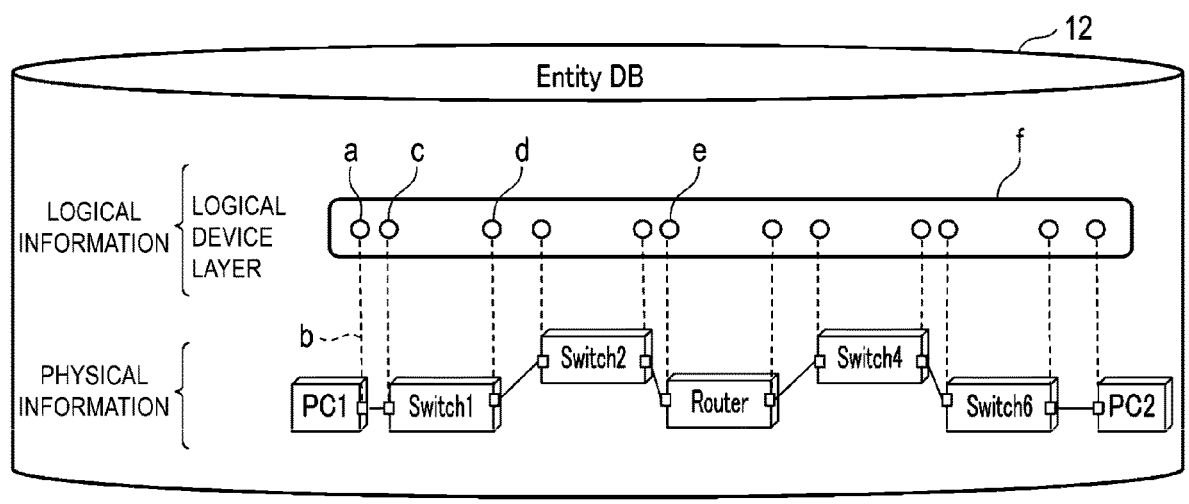
FIG. 21 is a diagram illustrating an example of TPE generation of the logical device layer.

FIGS. 20 and 21 are diagrams illustrating an example of generation of TPE of the logical device layer.
Specifically, the entity complementation unit 13 generates the TPE entities as illustrated in FIG. 20 for the acquired Specs of the logical device layer. Illustration of a part of the generation is omitted.
Each TPE entity is relevant to the PP entity illustrated in the bottom row in FIG. 20. Finally, the entity complementation unit 13 generates twelve TPE entities illustrated in FIG. 21.

Figure 23:
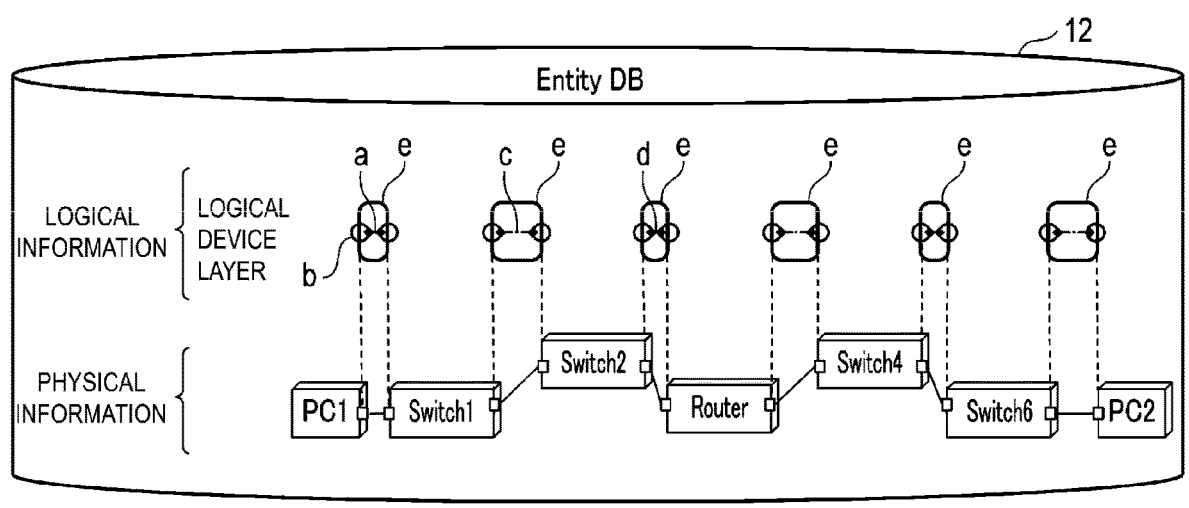
FIG. 23 is a diagram illustrating an example of TL generation of the logical device layer.

An example of a correspondence of "Used Spec", "Generated TPE entity of logical device layer", and "Relevant physical entity" illustrated in FIG. 20 is as described in (a) to (d) below.
(a)
(Used Spec) TPE_PC_LD
(Generated TPE entity of logical device layer) PC1_P1_LD_TPE
(Relevant physical entity) PC1_P1
(b)
(Used Spec) TPE_SW_LD
(Generated TPE entity of logical device layer) Switch1_P1_LD_TPE
(Relevant physical entity) Switch1_P1
(c)
(Used Spec) TPE_SW_LD
(Generated TPE entity of logical device layer) Switch1_P2_LD_TPE
(Relevant physical entity) Switch1_P2
(d)
(Used Spec) TPE_R_LD
(Generated TPE entity of logical device layer) Router_P1_LD_TPE
(Relevant physical entity) Router_P1
  Meanings of a, b, c, d, e, and f in FIG. 21 are as follows.
(a) "PC1_P1_LD_TPE" entity using "TPE_PC_LD" Spec
(b) "PC1_P1_LD_TPE" entity is relevant to the "PC1_P1" entity.
(c) "Switch1_P1_LD_TPE" entity using "TPE_SW_LD" Spec
(d) "Switch1_P2_LD_TPE" entity using "TPE_SW_LD" Spec
(e) "Router_P1_LD_TPE" entity using "TPE_R_LD" Spec
(f) TPE Entity generated by the process of this processing
(2) The entity complementation unit 13 generates TL of the logical device layer. In the generation, the entity complementation unit 13 holds information indicating a relevance to TPE of the logical device layer in the internal memory.
FIGS. 22 and 23 are diagrams illustrating an example of generation of TL of the logical device layer. Specifically, the entity complementation unit 13 generates the TL entities as illustrated in FIG. 22 for the acquired Spec of the logical device layer. Illustration of a part of the generation is omitted.
Each TL entity is relevant to the TPE entity of the logical device layer illustrated in the bottom row in FIG. 22. Finally, the entity complementation unit 13 generates the six TL entity illustrated in FIG. 23.

Figure 25:
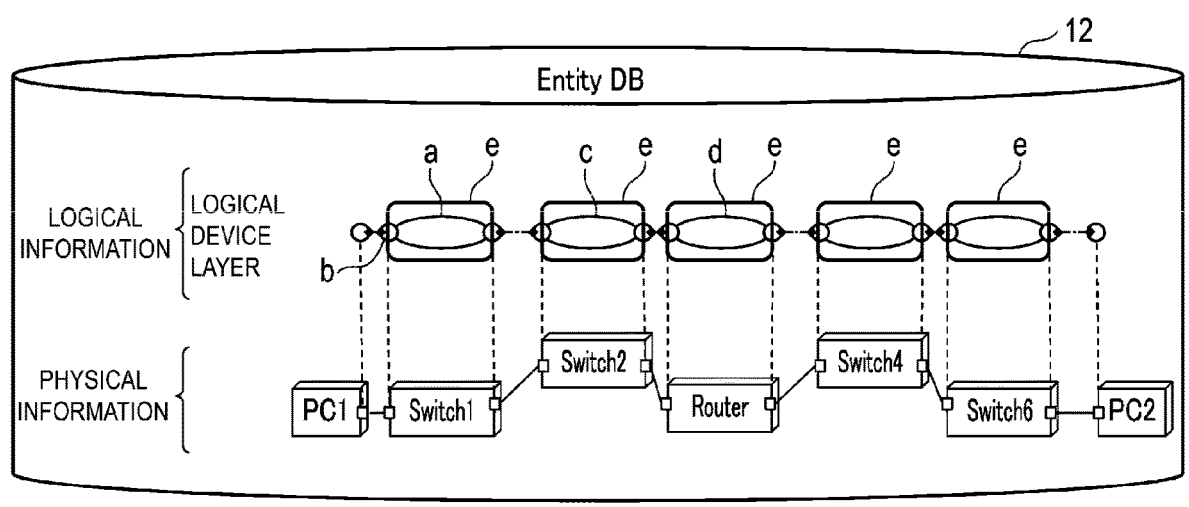
FIG. 25 is a diagram illustrating an example of NFD generation of the logical device layer.

Examples of correspondence of "Used Spec", "Generated TL entity of logical device layer", and "Relevant TPE entity of logical device layer" illustrated in FIG. 23 are as described in (a) to (c) below.
(a)
(Used Spec) TL_PC-SW
(Generated TL entity of logical device layer) PC1-Switch1_TL
(Relevant TPE entity of logical device layer) PC1_P1_LD_TPE, Switch1_P1_LD_TPE
(b)
(Used Spec) TL_SW-SW
(Generated TL entity of logical device layer) Switcl-Switch2_TL
(Relevant TPE entity of logical device layer) Switch1_P2_LD_TPE, Switch2_P1_LD_TPE
(c)
(Used Spec) TL_SW-R
(Generated TL entity of logical device layer) Switch2-Router_TL
(Relevant TPE entity of logical device layer) Switch2_P2_LD_TPE, Router_P1_LD_TPE
  Meanings of a, b, c, d, and e in FIG. 23 are as follows.
(a) "PC1-Switch1_TL" entity using "TPE_PC-SW" Spec
(b) The "PC1-Switch1_TL" entity is relevant to the "PC1_P1_LD_TPE" entity and the "Switch1_P1_LD_TPE" entity.
(c) "Switch1-Switch2_TL" entity using "TL_SW-SW" Spec
(d) "Switch2-Router_TL" entity using "TL_SW-R" Spec
(e) TL entity generated by the process of this processing
(3) The entity complementation unit 13 generates NFD of the logical device layer. In the generation, the entity complementation unit 13 holds information indicating the relevance to TPE of the logical device layer in the internal memory.
FIGS. 24 and 25 are diagrams illustrating an example of generation of NFD of the logical device layer.
Specifically, the entity complementation unit 13 generates NFD entities as illustrated in FIG. 24 for the acquired Spec of the logical device layer. Illustration of a part of the generation is omitted.
Each NFD entity is relevant to the TPE entity of the logical device layer illustrated in the bottom row in FIG. 24. Finally, the entity complementation unit 13 generates the five NFD entities illustrated in FIG. 25.

Figure 27:
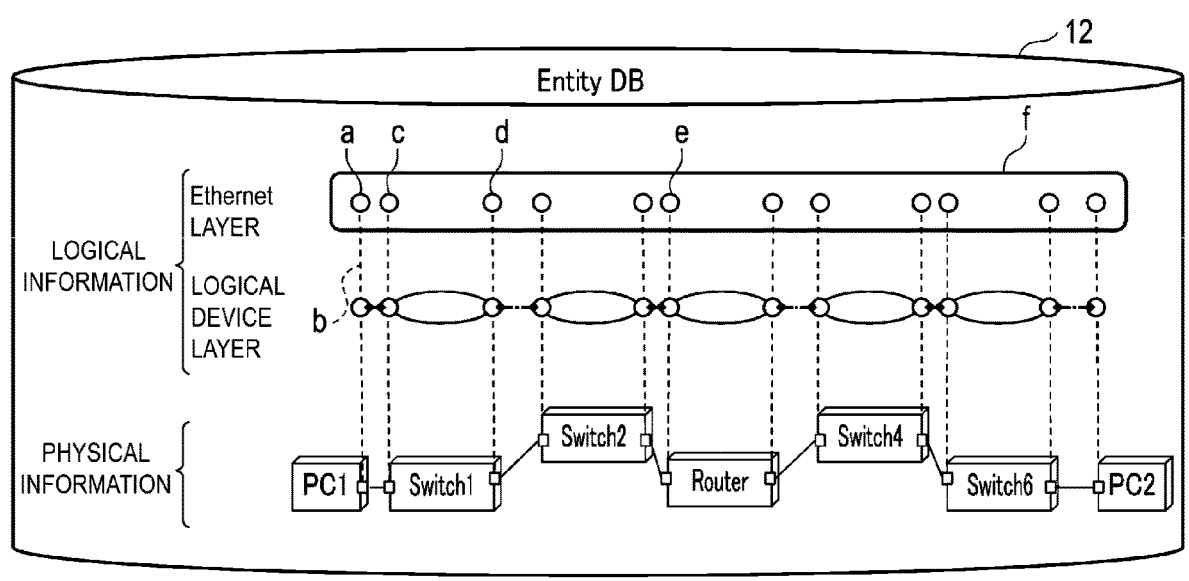
FIG. 27 is a diagram illustrating an example of TPE generation of the logical layer.

Examples of correspondence of "Used Spec", "Generated NFD entity of logical device layer", and "Relevant TPE entity of logical device layer" illustrated in FIG. 24 are as described in (a), (b), an (c) below.
(a)
(Used Spec) NFD_SW
(Generated NFD entity of logical device layer) Switch1_NFD
(Relevant TPE entity of logical device layer) Switch1_P1_LD_Tpe, Switch1_P2_LD_TPE
(b)
(Used Spec) NFD_SW
(Generated NFD entity of logical device layer) Switch2_NFD
(Relevant TPE entity of logical device layer) Switch2_P1_LD_TPE, Switch2_P2_LD_TPE
(c)
(Used Spec) NFD_R
(Generated NFD entity of logical device layer) Router_NFD (Relevant TPE entity of logical device layer) Router_P1_LD_TPE, Router_P2_LD_TPE Meanings of a, b, c, d, and e in FIG. 25 are as follows.
(a) "Switch1_NFD" using "NFD_SW" Spec
(b) The "Switch1_NFD" entity is relevant to the "Switch1_P1_LD_TPE" entity and the "Switch1_P2_LD_TPE" entity.
(c) "Switch2_NFD" entity using "NFD_SW" Spec
(d) "Router_NFD" entity using "NFD_R" Spec
(e) NFD entity generated by the process of this processing
(4) The entity complementation unit 13 generates TPE of the logical layer. In the generation, the entity complementation unit 13 holds information indicating a relevance to TPE of a lower logical layer in the internal memory.
FIGS. 26 and 27 are diagrams illustrating an example of generation of TPE of the logical layer. Specifically, the entity complementation unit 13 generates TPE entities illustrated in FIG. 26 for the Spec of the Ethernet layer that is higher than the logical device layer. Illustration of a part of the generation is omitted.
Each TPE entity is relevant to the TPE entity of the lower logical device layer illustrated in the bottom row in FIG. 26. Finally, the entity complementation unit 13 generates twelve TPE entities illustrated in FIG. 27.

Figure 29:
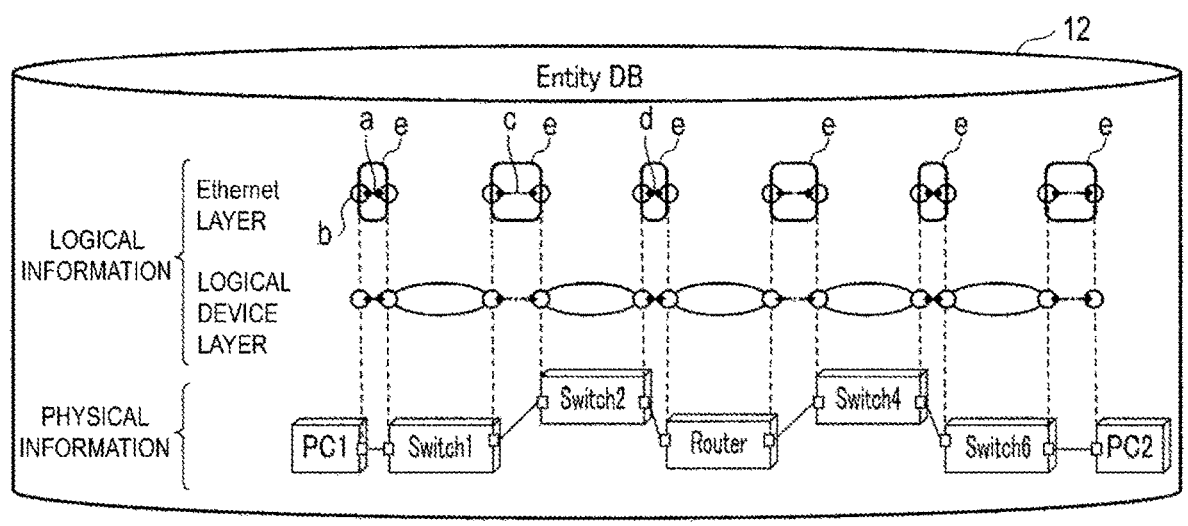
FIG. 29 is a diagram illustrating an example of FRE(LC) generation of the logical layer.

Examples of correspondence of "Used Spec", "Generated TPE entity of Ethernet layer", and "Relevant TPE entity of logical device layer" illustrated in FIG. 26 are as described in (a), (b), (c), and (d) below.
(a)
(Used Spec) PC1_P1_E_TPE
(Generated TPE entity of Ethernet layer) PC1_P1_E_TPE
(Relevant TPE entity of logical device layer) PC1_P1_LD_TPE
(b)
(Used Spec) TPE_SW_E
(Generated TPE entity of Ethernet layer) Switch1_P1_E_TPE
(Relevant TPE entity of logical device layer) Switch1_P1_LD_TPE
(c)
(Used Spec) TPE_SW_E
(Generated TPE entity of Ethernet layer) Switch1_P2_E_TPE
(Relevant TPE entity of logical device layer) Switch1_P2_LD_TPE
(d)
(Used Spec) TPE_R_E
(Generated TPE entity of Ethernet layer) Router_P1_E_TPE
(Relevant TPE entity of logical device layer) Router_P1_LD_TPE Meanings of a, b, c, d, e, and f in FIG. 27 as follows.
(a) "PC1_P1_E_TPE" entity using "TPE_PC_E" Spec
(b) The "PC1_P1_E_TPE" entity is relevant to the "PC1_P1_LD_TPE" entity.
(c) "Switch1_P1_E_TPE" entity using "TPE_SW_E" Spec
(d) "Switch1_P2_E_TPE" entity using "TPE_SW_E" Spec
(e) "Router_P1_E_TPE" entity using "TPE_R_E" Spec
(f) TPE entity generated by the process of this processing
(5) The entity complementation unit 13 generates FRE(LC) of the logical layer. In the generation, the entity complementation unit 13 holds information indicating a relevance to TPE of the corresponding layer in the internal memory.
FIGS. 28 and 29 are diagrams illustrating an example of generation of FRE(LC) of the logical layer. Specifically, the entity complementation unit 13 generates the FRE(LC) entities illustrated in FIG. 28 for the Spec of the Ethernet layer that is higher than the logical device layer. Illustration of a part of the generation is omitted. Each FRE(LC) entity is relevant to the TPE entity of the Ethernet layer illustrated in the bottom row in FIG. 28. Finally, the entity complementation unit 13 generates six FRE(LC) entities illustrated in FIG. 29.

Figure 31:
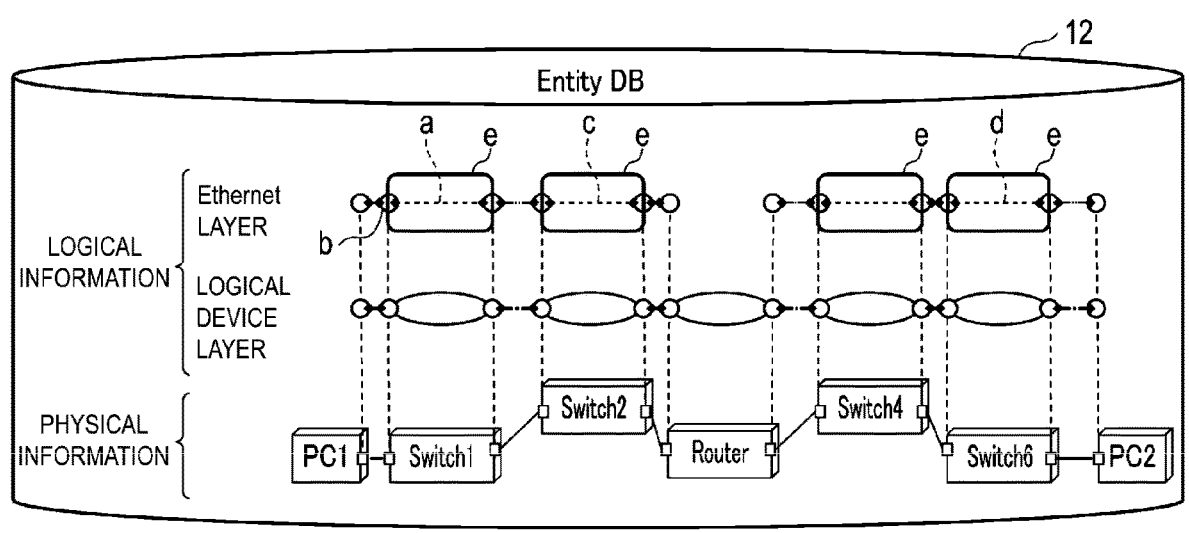
FIG. 31 is a diagram illustrating an example of FRE(XC) generation of the logical layer.

Examples of correspondence of "Used Spec", "Generated FRE(LC) of Ethernet layer", and "Relevant TPE entity of Ethernet layer" illustrated in FIG. 28 are as described in (a), (b), and (c) below.
(a)
(Used Spec) FRELC_PC-SW_E
(Generated FRE (LC) entity of Ethernet layer) PC1-Switch1_E_FRELC
(Relevant TPE entity of Ethernet layer) PC1_P1_E_TPE, Switch1_P1_E_TPE
(b)
(Used Spec) FRELC_SW-SW_E
(Generated FRE(LC) entity of Ethernet layer) Switch1-Switch2_E_FRELC
(Relevant TPE entity of Ethernet layer) Switch1_P2_E_TPE, Switch2_P1_E_TPE
(c)
(Used Spec) FRELC_SW-R_E
(Generated FRE(LC) entity of Ethernet layer) Switch2-Router_E_FRELC
(Relevant TPE entity of Ethernet layer) Switch2_P2_E_TPE, Router_P1_E_TPE Meanings of a, b, c, d, an e in FIG. 29 are as described in (a) to (e) below.
(a) "PC-Switch1_E_FRELC" entity using "FRELC_PC-SW_E" Spec
(b) The "PC1-Switch1_E_FRELC" entity is relevant to the "PC1_P1_E_TPE" entity and the "Switch1_P1_E_TPE" entity.
(c) "Switch1-Switch2_E_FRELC" entity using "FRELC_SW-SW_E" Spec
(d) "Switch2-Router_E_FRELC" entity using "FRELC_SW-R_E" Spec
(e) FRE(LC) entity generated by the process of this processing
(6) The entity complementation unit 13 generates FRE(XC) of the logical layer. In the generation, the entity complementation unit 13 holds information indicating a relevance to TPE of the corresponding layer in the internal memory.
FIGS. 30 and 31 are diagrams illustrating diagrams of an example of generation of FRE(XC) of the logical layer. Specifically, the entity complementation unit 13 generates FRE(XC) entities illustrated in FIG. 30 for the Spec of the Ethernet layer in the higher level of the logical device layer. Illustration of a part of the generation is omitted.
Each FRE(XC) entity is relevant to the TPE entity of the Ethernet layer illustrated in the bottom row in FIG. 30. Finally, the entity complementation unit 13 generates four FRE(XC) entities illustrated in FIG. 31.

Figure 33:
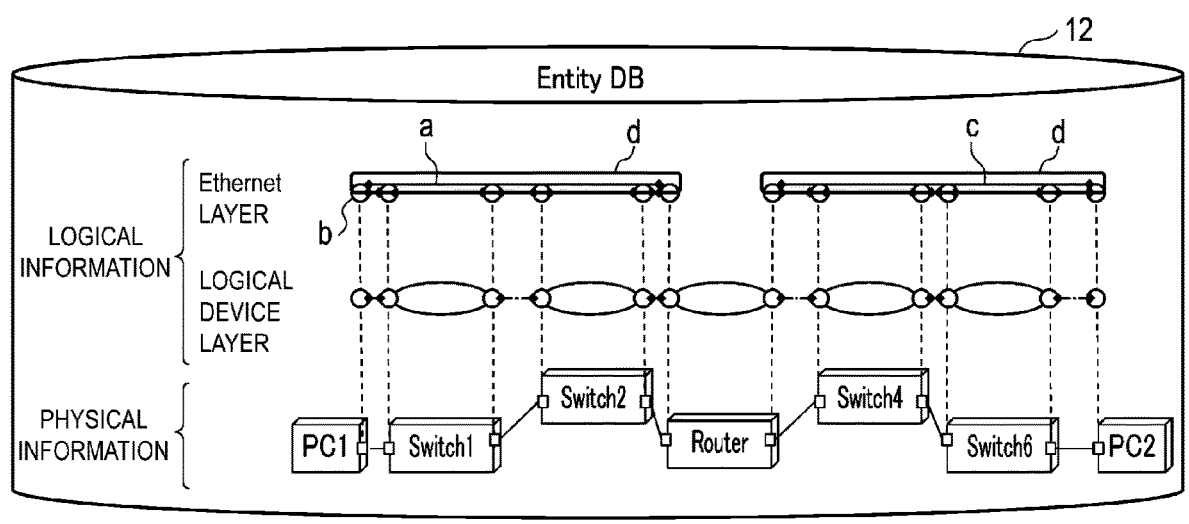
FIG. 33 is a diagram illustrating an example of FRE(NC) generation of the logical layer.

Examples of correspondence of "Used Spec", "Generated FRE(XC) entity of Ethernet layer", and "Relevant TPE entity of Ethernet layer" illustrated in FIG. 30 are as described in (a), (b), and (c) below.
(a)
(Used Spec) FREXC_SW_E
(Generated FRE(XC) entity of Ethernet layer) Switch1_E_FREXC
(Relevant TPE entity of Ethernet layer) Switch1_P1_E_TPE, Switch1_P2_E_TPE (b)
(Used Spec) FREXC_SW_E
(Generated FRE(XC) entity of Ethernet layer) Switch2_E_FREXC
(Relevant TPE entity of Ethernet layer) Switch2_P1_E_TPE, Switch2_P2_E_TPE
(c)
(Used Spec) FREXC_SW_E
(Generate FRE(XC) entity of Ethernet layer) Switch6_E_FREXC
(Relevant TPE entity of Ethernet layer) Switch6_P1_E_TPE, Switch6_P2_E_TPE Meanings of a, b, c, d, and e in FIG. 31 are as described in (a) to (e) below.
(a) "Switch1_E_FREXC" entity using "FREXC_SW_E" Spec
(b) The "Switch1_E_FREXC" entity is relevant to the "Switch1_P1_E_TPE" entity and the "Switch1_P2_E_TPE" entity.
(c) "Switch2_E_FREXC" entity using "FREXC_SW_E" Spec
(d) "Switch6_E_FREXC" entity using "FREXC_SW_E" Spec
(e) FRE(XC) entity generated by the process of this processing (7) The entity complementation unit 13 generates FRE(NC) of the logical layer. In the generation, the entity complementation unit 13 holds information indicating a relevance to TPE of the corresponding layer in the internal memory. FIGS. 32 and 33 are diagrams illustrating an example of generation of FRE(NC) of the logical layer. Specifically, the entity complementation unit 13 generates FRE(NC) entities illustrated in FIG. 32 for the spec of the Ethernet layer in the higher level of the logical device layer. Each FRE(NC) entity is relevant to the TPE entity of the Ethernet layer illustrated in the bottom row in FIG. 32. Finally, the entity complementation unit 13 generates two FRE(NC) entities illustrated in FIG. 33.

Examples of correspondence of "Used Spec", "Generated FRE(NC) entity of Ethernet layer", and "Relevant TPE entity of Ethernet layer" illustrated in FIG. 32 are as described in (a) and (b) below.
(a)
(Used Spec) FRENC_PC-R_E
(Generated FRE(NC) entity of Ethernet layer) PC1-Router_E_FRENC
(Relevant TPE entity of Ethernet layer) PC1_P1_E_TPE, Router_P1_E_TPE
(b)
(Used Spec) FRENC_PC-R_E
(Generated FRE(NC) entity of Ethernet layer) Router-PC2_E_FRENC
(Relevant TPE entity of Ethernet layer) Router_P2_E_TPE, PC2_P1_E_TPE Meanings of a, b, c, and d in FIG. 33 are as described in (a) to (d) below.
(a) "PC1-Router_E_FRENC" entity using "FRENC_PC-R_E" Spec
(B) The "PC1-Router_E_FRENC" entity is relevant to the "PC1_P1_E_TPE" entity and the "Router_P1_E_TPE" entity.
(c) "Router-PC2_E_FRENC" entity using "FRENC_PC-R_E" Spec
(d) FRE(NC) entity generated by the process of this processing Next, (4) above performed for the second time will be described. Here, the entity complementation unit 13 generates TPE of the logical layer. In the generation, the entity complementation unit 13 holds information indicating a relevance to TPE of a lower logical layer in the internal memory.

Figure 35:
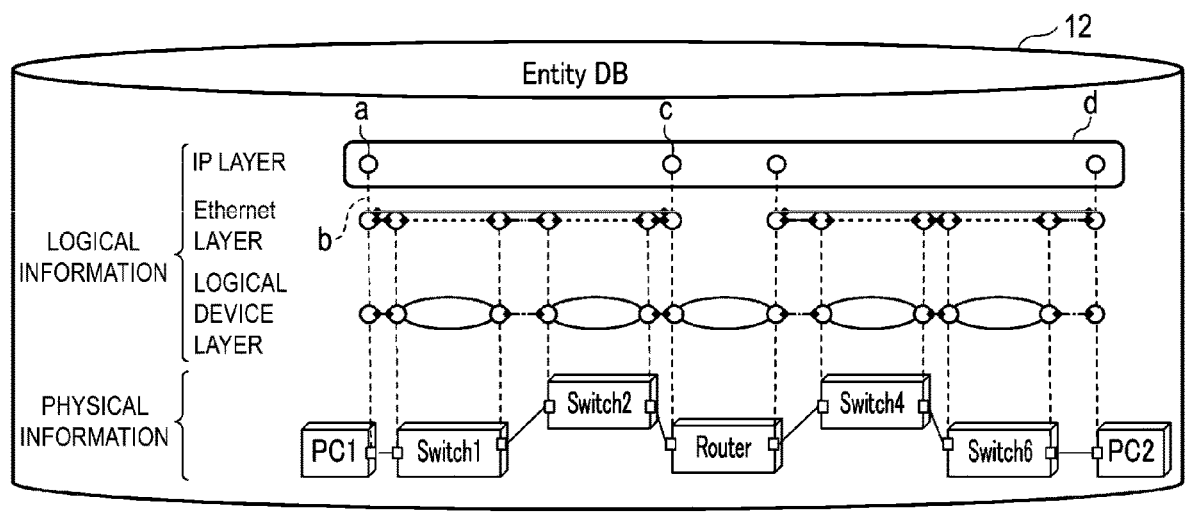
FIG. 35 is a diagram illustrating an example of TPE generation of the logical layer.

FIGS. 34 and 35 are diagrams illustrating an example of generation of TPE of the logical layer. Specifically, the entity complementation unit 13 generates the TPE entities illustrated in FIG. 34 for the Spec of the IP layer in the higher level of the Ethernet layer.

Each TPE entity is relevant to the TPE entity of the Ethernet layer illustrated in the bottom row in FIG. 34. Finally, the entity complementation unit 13 generates four TPE entities illustrated in FIG. 35.

Examples of correspondence of "Used Spec", "Generated TPE entity of the IP layer", and "Relevant TPE entity of Ethernet layer" illustrated in FIG. 34 are as described in (a), (b), (c), and (d) below.
(a)
(Used Spec) TPE_PC_IP
(Generated TPE entity of IP layer) PC1_P1_IP_TPE
(Relevant TPE entity of Ethernet layer) PC1_P1_E_TPE
(b)
(Used Spec) TPE_R_IP
(Generated TPE entity of IP layer) Router_P1_IP_TPE
(Relevant TPE entity of Ethernet layer) Router_P1_E_TPE
(c)
(Used Spec) TPE_R_IP
(Generated TPE entity of IP layer) Router_P2_IP_TPE
(Relevant TPE entity of Ethernet layer) Router_P2_E_TPE
(d)
(Used Spec) TPE_PC_IP
(Generated TPE entity of IP layer) PC2_P1_IP_TPE
(Relevant TPE entity of Ethernet layer) PC2_P1_E_TPE Meanings of a, b, c, and d in FIG. 35 are as described in (a) to (d) below.
(a) "PC1_P1_IP_TPE" entity using "TPE_PC_IP" Spec
(b) The "PC1_P1_IP_TPE" entity is relevant to the "PC1_P1_E_TPE" entity.
(c) "Router_P1_IP_TPE" entity using "TPE_R_IP" Spec
(d) TPE entity generated by the process of this processing Next, (5) above performed for the second time will be described. Here, the entity complementation unit 13 generates FRE(LC) of the logical layer. In the generation, the entity complementation unit 13 holds information indicating a relevance to TPE of the corresponding layer in the internal memory.

Figure 37:
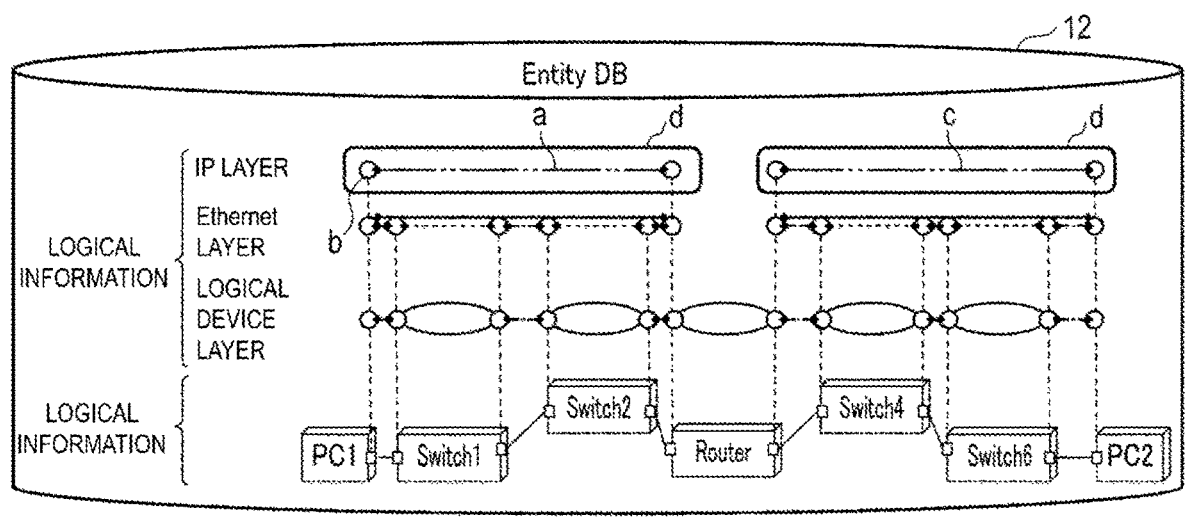
FIG. 37 is a diagram illustrating an example of FRE(LC) generation of the logical layer.

FIGS. 36 and 37 are diagrams illustrating an example of generation of FRE(LC) of the logical layer.

Specifically, the entity complementation unit 13 generates FRE(LC) entities illustrated in FIG. 36 for the Spec of the IP layer in the higher level of the Ethernet layer.

Each TPE entity is relevant to the TPE entity of the IP layer illustrated in the bottom row in FIG. 36. Finally, the entity complementation unit 13 generates two FRE(LC) entities illustrated in FIG. 37.

Examples of correspondence of "Used Spec", "Generated FRE(LC) entity of IP layer", and "Relevant TPE entity of IP layer" illustrated in FIG. 36 are as described in (a) and (b) below.
(a)
(Used Spec) FRELC_PC-R_IP
(Generated FRE(LC) entity of IP layer) PC1-Router_IP_FRELC
(Relevant TPE entity of IP layer) PC1_P1_IP_TPE, Router_P1_IP_TPE (b)
(Used Spec) FRELC_PC-R_IP
(Generated FRE(LC) entity of IP layer) Router-PC2_IP_FRELC
(Relevant TPE entity of IP layer) Router_P2_IP_TPE, PC2_P1_IP_TPE Meanings of a, b, c, and d in FIG. 37 are as described in (a) to (d) below.
(a) "PC1-Router-IP_FRELC" using "FRELC_PC-R_IP" Spec
(b) The "PC1-Router_IP_FRELC" entity is relevant to the "PC1_P1_IP_TPE" entity and the "Router_P1_IP_TPE" entity.
(c) "Router-PC2_IP_FRELC" entity using "FRELC_PC-R_IP" Spec
(d) FRE(LC) entity generated by the process of this processing Next, (6) above performed for the second time will be described. Here, the entity complementation unit 13 generates FRE(XC) of the logical layer. In the generation, the entity complementation unit 13 holds information indicating a relevance to TPE of the corresponding layer in the internal memory.

Figure 38:
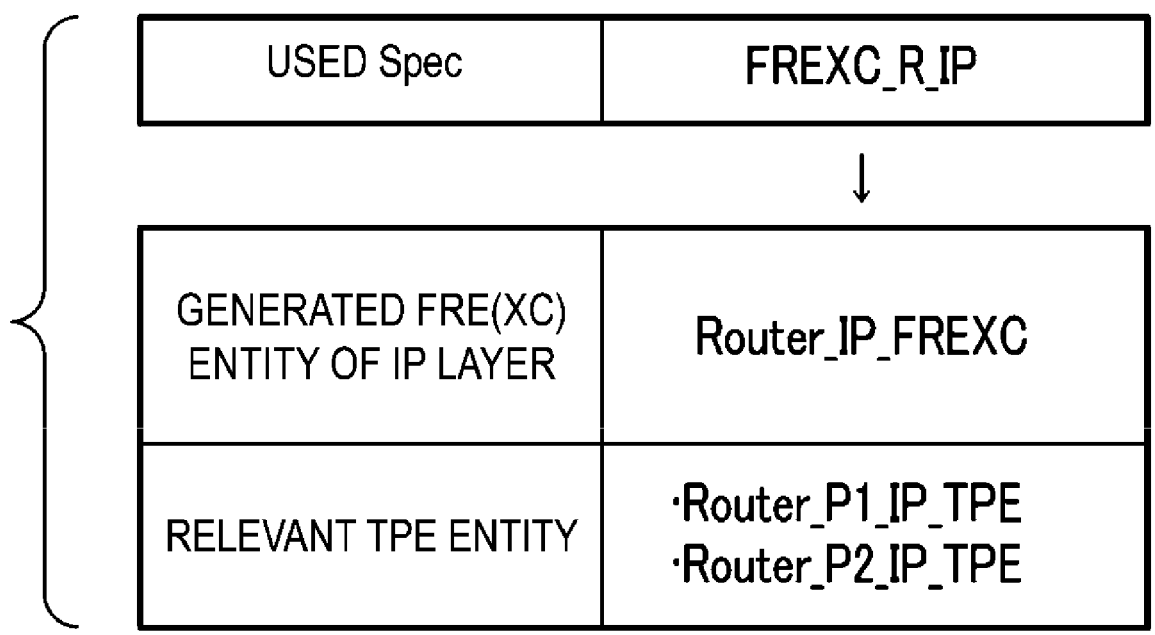
FIG. 38 is a diagram illustrating an example of FRE(XC) generation of the logical layer.
Figure 39:
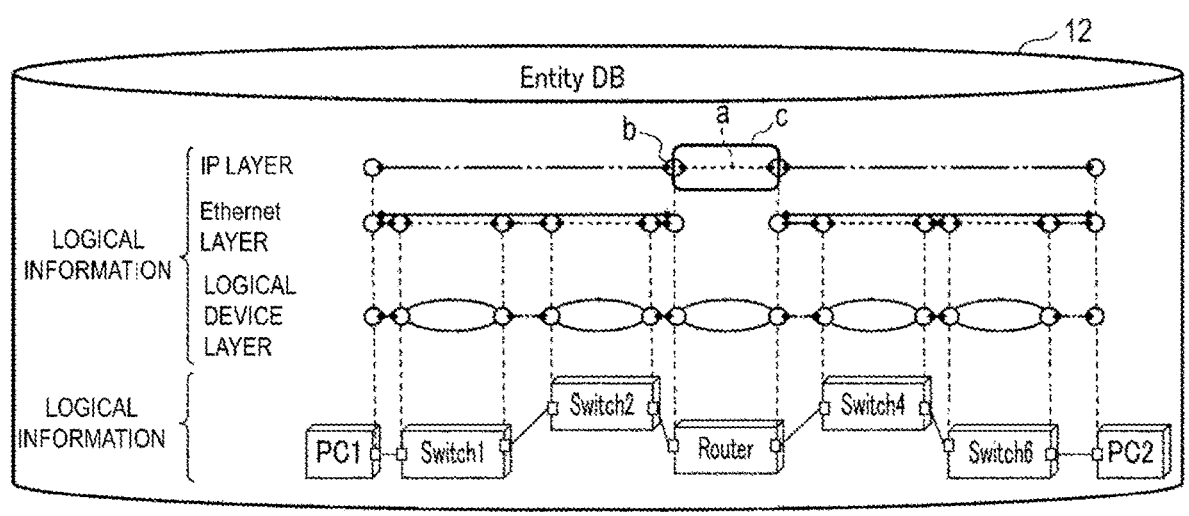
FIG. 39 is a diagram illustrating an example of FRE(XC) generation of the logical layer.

FIGS. 38 and 39 are diagrams illustrating an example of generation of FRE(XC) of the logical layer.

Specifically, the entity complementation unit 13 generates FRE(XC) entities illustrated in FIG. 38 for the Spec of the IP layer in the higher level of the Ethernet layer.

Each TPE entity is relevant to the TPE entity of the IP layer illustrated in the bottom row in FIG. 38. Finally, the entity complementation unit 13 generates one FRE(XC) entity illustrated in FIG. 39.

An example of correspondence of "Used Spec", "Generated FRE(XC) entity of IP layer", and "Relevant TPE entity of IP layer" illustrated in FIG. 38 is as described in (a) below.
(a)
(Used Spec) FREXC_R_IP
(Generated FRE(XC) entity of IP layer) Router_IP_FREXC
(Relevant TPE entity of IP layer) Router_P1_IP_TPE, Router_P2_IP_TPE Meanings of a, b, and c in FIG. 39 are as described in (a) to (c) below.
(a) "Router_IP_FREXC" entity using "FREXC_R_IP" Spec
(b) The "Router_IP_FREXC" entity is relevant to the "Router_P1_IP_TPE" entity and the "Router_P2_IP_TPE" entity
(c) FRE(XC) entity generated by the process of this processing Next, (7) above performed for the second time will be described. Here, the entity complementation unit 13 generates FRE(NC) of the logical layer. In the generation, the entity complementation unit 13 holds information indicating a relevance to TPE of the corresponding layer in the internal memory.

Figure 40:
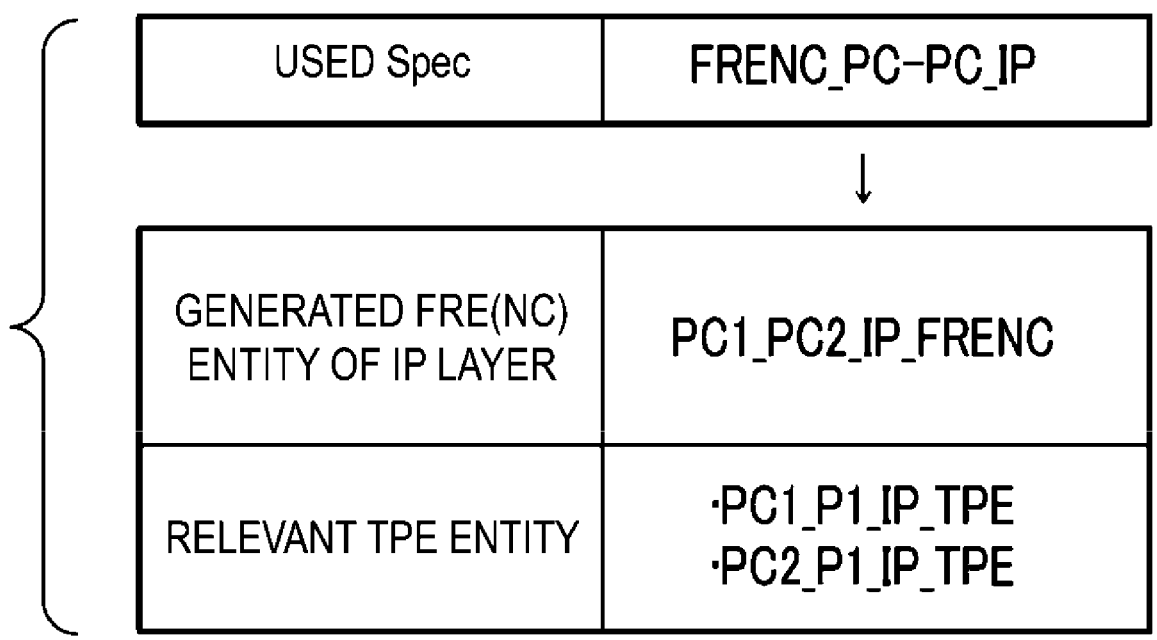
FIG. 40 is a diagram illustrating an example of FRE(NC) generation of the logical layer.
Figure 41:
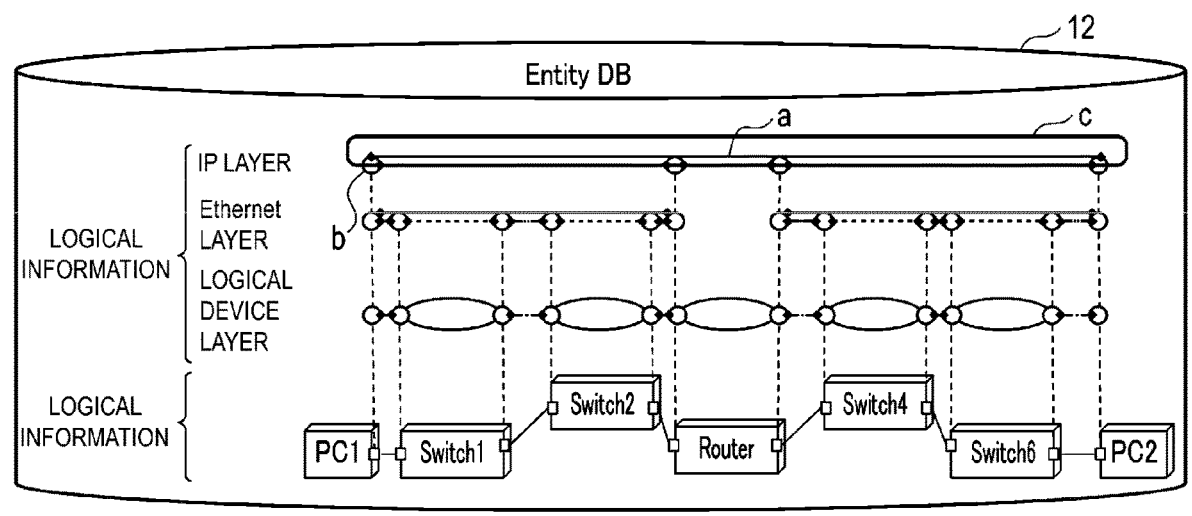
FIG. 41 is a diagram illustrating an example of FRE(NC) generation of the logical layer.

FIGS. 40 and 41 are diagrams illustrating an example of generation of FRE(NC) of the logical layer.

Specifically, the entity complementation unit 13 generates the FRE(NC) entities illustrated in FIG. 40 for the Spec of the IP layer in the higher level of the Ethernet layer.

Each TPE entity is relevant to the TPE entity of the IP layer illustrated in the bottom row in FIG. 40. Finally, the entity complementation unit 13 generates one FRE(NC) entity illustrated in FIG. 41.

An example of correspondence of "Used Spec", "Generated FRE(NC) entity of IP layer", and "Relevant TPE entity of IP layer" illustrated in FIG. 40 is as described in (a) below.
(a)
(Used Spec) FRENC_PC-PC_IP
(Generated FRE(NC) entity of IP layer) PC1-PC2_IP_FRENC
(Relevant TPE entity of IP layer) PC1_P1_IP_TPE, PC2_P1_IP_TPE Meanings of a, b, and c in FIG. 41 are as described in (a) to (c) below.
(a) "PC1-PC2_IP_FRENC" entity using "FRENC_PC-PC_IP" Spec
(b) The "PC1-PC2_IP_FRENC" entity is relevant to the "PC1_P1_IP_TPE" entity and the "PC2_P1_IP_TPE" entity.
(c) FRE(NC) entity generated by the process of this processing After (7) above is performed for the second time, no layer is present that is higher than the IP layer, and the entity complementation unit 13 thus terminates the entity complementation (generation) processing.

Next, a network state after various kinds of processing including the entity complementation processing is performed by the network management system 10 will be described.

Figure 42:
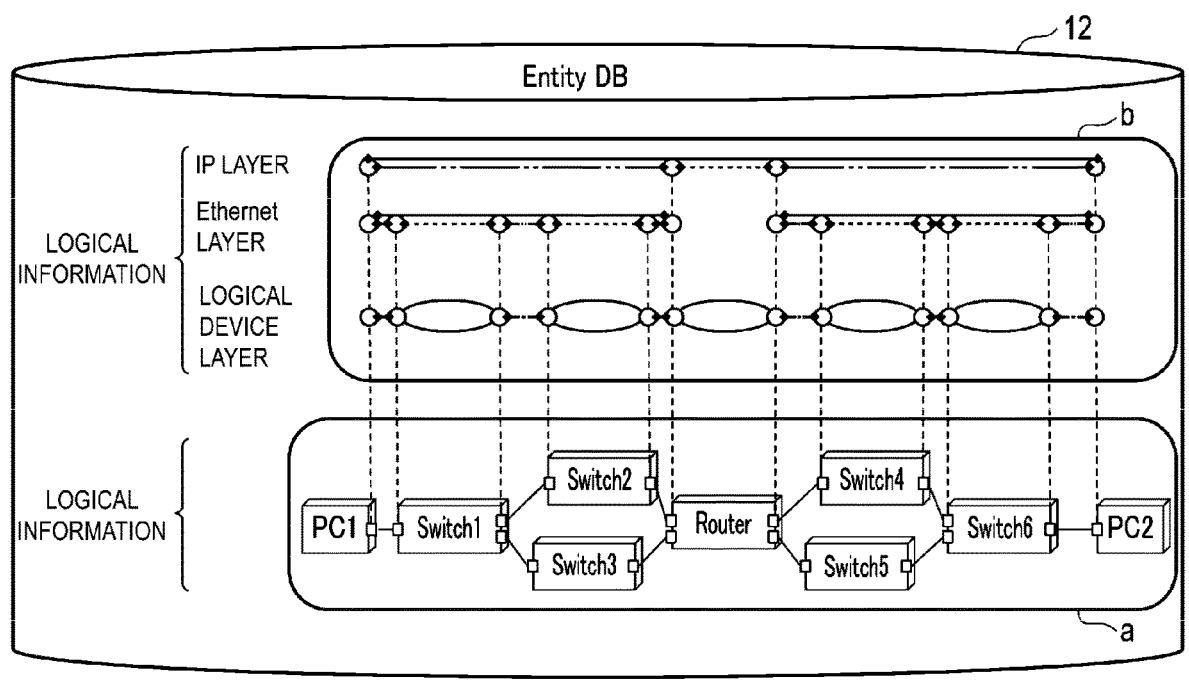
FIG. 42 is a diagram illustrating an example of a network state after the network management system performs various kinds of processing.

FIG. 42 is a diagram illustrating an example of a network state after various kinds of processing is performed by the network management system.

As illustrated in FIG. 42, the entities registered in the entity DB 12 after the network management system performs various kinds of processing are a total of 90 entities.

Among these, a total of thirty four entities including "PD: 9, PP: 20, PL: 5" registered as physical information in the entity DB 12 illustrated in a in FIG. 42 are generated by the operator. Also, a total of fifty six entities including "TL: 6, NFD: 6, TPE: 28, FRE(NC): 3, FRE(LC): 8, FRE(XC): 5" illustrated in b in FIG. 42 are generated by the entity complementation unit 13.

Figure 43:
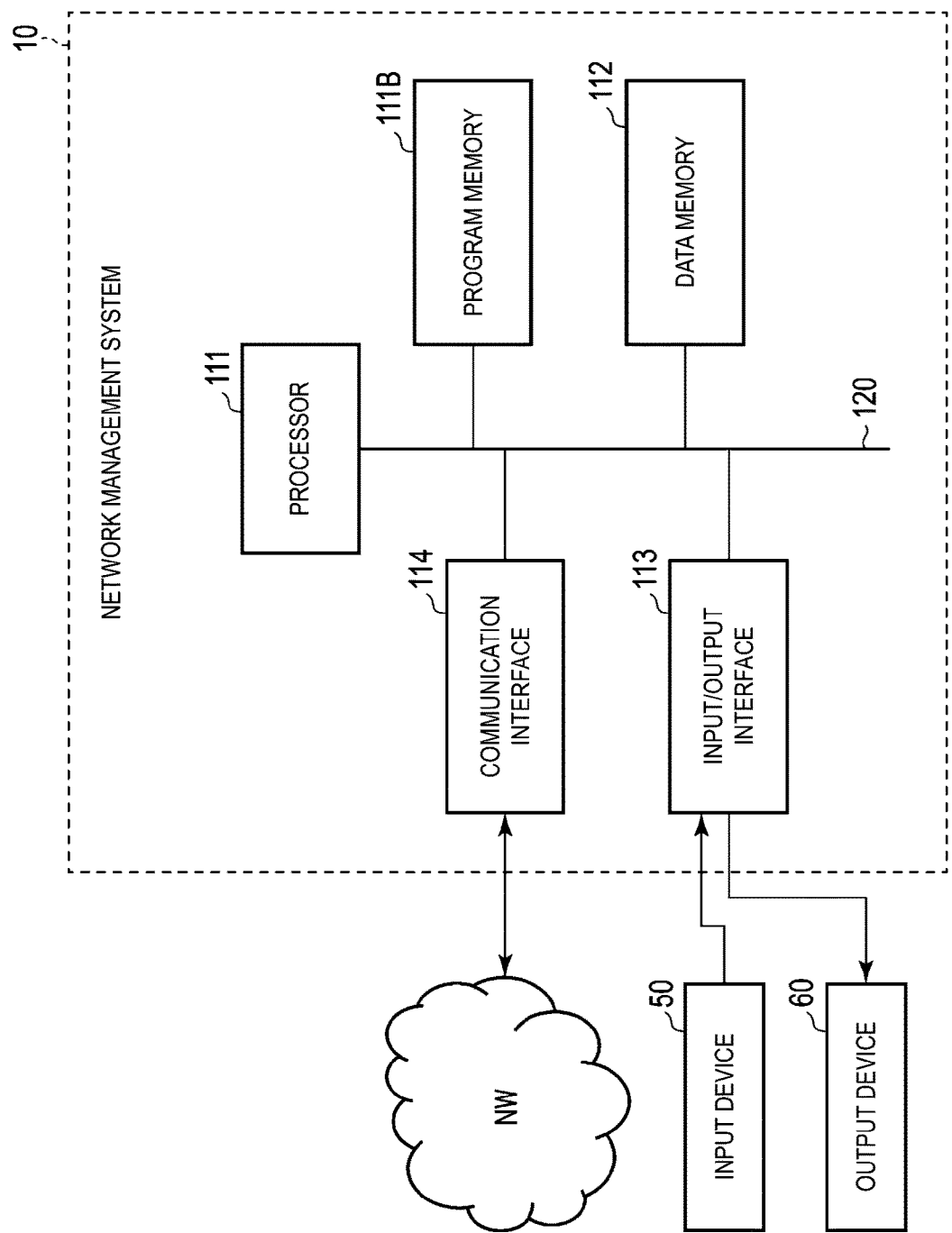
FIG. 43 is a block diagram illustrating an example of a hardware configuration of the network management device according to an embodiment of the present invention.

FIG. 43 is a block diagram illustrating an example of a hardware configuration of the network management device according to an embodiment of the present invention.

In the example illustrated in FIG. 43, the network management system 10 according to the aforementioned embodiment includes a server computer or a personal computer, for example, and has a hardware processor 111A such as a CPU. Also, a program memory 111B, a data memory 112, an input and output interface 113, and a communication interface 114 are connected to the hardware processor 111A via a bus 120.

The communication interface 114 includes, for example, one or more wireless communication interface units to allow transmission/reception of information to/from a communication network NW. As the wireless interface, for example, an interface adopting a small power wireless data communication standard such as a wireless local area network (LAN) is used.

An input device 50 and an output device 60 for the operator additionally provided for the network management system 10 are connected to the input and output interface 113.

The input and output interface 113 performs processing of taking operation data input by the operator through the input device 50 such as a keyboard, a touch panel, a touchpad, or a mouse and outputting the output data to the output device 60 including a display device using liquid crystal or organic electro luminescence (EL) and causing the output device 60 to display the output data. Note that, as the input device 50 and the output device 60, devices incorporated in the network management system 10 may be used, or an input device and an output device of another information terminal may be used that are capable of communicating with the network management system 10 via the network NW.

For the program memory 111B, a non-volatile memory that always allows writing and reading, such as a hard disk drive (HDD) or a solid state drive (SSD) and a non-volatile memory such as a ROM, for example, are used in combination as a non-transitory tangible storage medium, and a program necessary to execute various kinds of control processing according to the embodiment is stored therein.

For the data memory 112, the aforementioned non-volatile memory and a volatile memory such as a random access memory (RAM) are used in combination as a tangible recording medium, and the data memory 112 is used to store various kinds of data acquired and created in the process of performing various kinds of processing.

The network management system 10 according to the embodiment of the present invention can be configured to be a data processing device including the path selection unit 11, the entity DB 12, the entity complementation unit 13, and the Spec DB 14, illustrated in FIG. 4 or the like, as a processing function unit of software.

The entity DB 12 and the Spec DB 14 can be configured by using the data memory 112 illustrated in FIG. 43. However, these regions are not essential configurations in the network management system 10 and may be regions provided in a storage device such as an external storage medium such as a universal serial bus (USB) memory or a data base server or the like arranged in a cloud, for example.

All the aforementioned processing function units can be implemented by causing the aforementioned hardware processor 111A to read and execute the program stored in the program memory 111B. Note that some or all of the processing function units may be implemented by other various methods including an integrated circuit such as an application specific integrated circuit (ASIC) or a field-programmable gate array (FPGA).

As described above, the network management system according to the embodiment of the present invention performs the path selection processing of selecting a path of a physical layer between a start point and an end point of the network based on an entity and generates an entity of a logical layer corresponding to the selected path of the physical layer based on a specification of an information object. It is thus possible to reduce a load of setting for the entity of the logical layer.

Also, in the network management system according to the embodiment of the present invention, a relationship between the physical layer and the lowermost logical layer and a relationship among a plurality of logical layers including the lowermost layer are defined, and the logical layer specification of each layer corresponding to the physical layer in the path is acquired based on the relationships. It is thus possible to appropriately acquire the specification of each logical layer of which entity is to be generated.

Also, in the network management system according to the embodiment of the present invention, when an entity of the logical layer corresponding to the path of the physical layer is generated, a relationship with an entity in an identical layer or a next lower layer is maintained, and the entity of each logical layer corresponding to the path of the physical layer is generated based on the relationship. It is thus possible to appropriately generate the entity of each logical layer corresponding to the physical layer.

Further, a method described in each embodiment can be stored as a program (software means) that can be executed by a calculator (computer) in a recording medium such as a magnetic disk (a floppy (registered trademark) disk, a hard disk, or the like), an optical disc (a CD-ROM, a DVD, a MO, or the like), a semiconductor memory (a ROM, a RAM, a flash memory, or the like), for example, or can be transmitted through a communication media, and can be distributed. Note that the program stored on the medium side includes a setting program for causing a software means (including not only an execution program but also a table and a data structure) that the calculator is caused to execute to be configured in the calculator. The calculator in which the present device is implemented executes the aforementioned processing by reading the program recorded in the recording medium, constructing the software means using the setting program in some cases, and causing the software means to control operations. Note that the recording medium referred to herein is not limited to a recording medium for distribution but includes a storage medium such as a magnetic disk or a semiconductor memory provided in the calculator or a device connected thereto via a network.

Note that the invention of the present application is not limited to the aforementioned embodiment and various modifications can be made without departing from the gist in the stage of implementation. Also, the embodiments may appropriately be performed in combination as long as possible, and in such a case, combined effects can be obtained. Further, the aforementioned embodiment include the invention in various stages, and various inventions can be extracted from appropriate combinations of a plurality of disclosed components.

REFERENCE SIGNS LIST

10 Network management system
11 Path selection unit
12 Entity DB
13 Entity complementation unit
14 Spec DB

The invention claimed is:

1. A network management device comprising:
a processor; and
a storage medium having computer program instructions stored thereon, when executed by the processor, perform to:
select a path of a physical layer between a start point and an end point of a network based on a first entity stored in a first storage device configured to store the first entity, the first entity representing an entity of an information object of the network; and
generat a second entity of a logical layer corresponding to the path of the physical layer selected based on a specification of the information object stored in a second storage device configured to store the specification;
wherein the second storage device stores, as the specification of the information object, information that defines a relationship between the physical layer and a logical layer that is a lowest layer and a relationship among a plurality of the logical layers including the lowest layer; and
the computer program instructions further perform to
acquire, from the second storage device, a first specification of the logical layer that is the lowest layer defined as a higher layer than the physical layer in the path selected by the path selection processing unit, acquire, from the second storage device, a second specification of a logical layer defined as a higher layer than the logical layer that is the lowest layer, and generate the second entity of each logical layer corresponding to the path of the physical layer selected based on the first specification and/or the second specification that is acquired.

2. A network management device comprising:

a processor; and a storage medium having computer program instructions stored thereon, when executed by the processor, perform to:

select a path of a physical layer between a start point and an end point of a network based on a first entity stored in a first storage device configured to store the first entity, the first entity representing an entity of an information object of the network;

generate a second entity of a logical layer corresponding to the path of the physical layer selected based on a specification of the information object stored in a second storage device configured to store the specification;

maintain a relationship with a third entity in an identical layer or a next lower layer when the second entity of the logical layer corresponding to the path of the physical layer selected by the path selection processing unit is generated, and generate the second entity of each logical layer corresponding to the path of the physical layer selected based on the held relationship.

3. A network management method that is performed by a network management device, the network management method comprising:

performing path selection processing of selecting a path of a physical layer between a start point and an end point of a network based on a first entity stored in a first storage device configured to store the first entity, the first entity representing an entity of an information object of the network;

performing entity generation processing of generating a second entity of a logical layer corresponding to the path of the physical layer selected in the path selection processing based on a specification of the information object stored in a second storage device configured to store the specification, wherein the second storage device stores, as the specification of the information object, information that defines a relationship between the physical layer and a logical layer that is a lowest layer and a relationship among a plurality of the logical layers including the lowest layer;

acquiring, from the second storage device, a first specification of the logical layer that is the lowest layer defined as a higher layer than the physical layer in the path selected in the path selection processing;

acquiring, from the second storage device, a second specification of a logical layer defined as a higher layer than the logical layer that is the lowest layer; and generating the second entity of each logical layer corresponding to the path of the physical layer selected in the path selection processing based on the first specification and/or the second specification that is acquired.

4. A network management method that is performed by a network management device, the network management method comprising:

performing path selection processing of selecting a path of a physical layer between a start point and an end point of a network based on a first entity stored in a first storage device configured to store the first entity, the first entity representing an entity of an information object of the network; and performing entity generation processing of generating a second entity of a logical layer corresponding to the path of the physical layer selected in the path selection processing based on a specification of the information object stored in a second storage device configured to store the specification wherein the performing of the entity generation processing includes maintaining a relationship with a third entity in an identical layer or a next lower layer when the second entity of the logical layer corresponding to the path of the physical layer selected by the path selection processing unit is generated, and generating the second entity of each logical layer corresponding to the path of the physical layer selected in the path selection processing based on the maintained relationship.

\* \* \* \* \*